US008249954B2

(12) United States Patent
Dolan et al.

(10) Patent No.: US 8,249,954 B2
(45) Date of Patent: Aug. 21, 2012

(54) THIRD-PARTY CERTIFICATION USING ENHANCED CLAIM VALIDATION

(75) Inventors: Andrew J. Dolan, Arvada, CO (US);
William R. Pape, Los Ojos, NM (US)

(73) Assignee: Aginfolink, Holdings, Inc., A BVI Corporation, Tortola (VG)

( * ) Notice: Subject to any disclaimer, the term of this patent is extended or adjusted under 35 U.S.C. 154(b) by 0 days.

(21) Appl. No.: 12/343,814

(22) Filed: Dec. 24, 2008

(65) Prior Publication Data

US 2009/0198596 A1 Aug. 6, 2009

Related U.S. Application Data

(60) Provisional application No. 61/022,192, filed on Jan. 18, 2008, provisional application No. 61/085,711, filed on Aug. 1, 2008.

(51) Int. Cl.
*G06Q 10/00* (2006.01)

(52) U.S. Cl. ............. 705/28; 705/7.15; 705/23; 705/37; 705/26.41; 705/35; 705/39; 705/22; 709/203; 709/223; 709/246; 709/225; 709/238; 709/204; 709/201; 709/219; 700/115; 700/103; 700/108; 700/106

(58) Field of Classification Search ...................... 705/28
See application file for complete search history.

(56) References Cited

U.S. PATENT DOCUMENTS

| 5,657,390 | A | 8/1997 | Elgamal et al. |
| 6,211,789 | B1 | 4/2001 | Oldham et al. |
| 6,260,024 | B1 * | 7/2001 | Shkedy ........................... 705/37 |
| 6,342,839 | B1 | 1/2002 | Curkendall et al. |
| 6,671,698 | B2 * | 12/2003 | Pickett et al. ......................... 1/1 |
| 6,778,872 | B2 | 8/2004 | Jorgenson et al. |
| 6,878,052 | B2 | 4/2005 | Andersson |
| 7,558,737 | B2 * | 7/2009 | Sudhi ............................. 705/317 |
| 7,890,388 | B2 | 2/2011 | Mariotti |
| 2003/0177025 | A1 | 9/2003 | Curkendall et al. |
| 2004/0123129 | A1 * | 6/2004 | Ginter et al. .................. 713/193 |
| 2004/0200892 | A1 | 10/2004 | Curkendall et al. |
| 2006/0184379 | A1 | 8/2006 | Tan et al. |

(Continued)

FOREIGN PATENT DOCUMENTS

FR 2 776 790 10/1999

(Continued)

OTHER PUBLICATIONS

Neumeier, Mike. Liaison Technologies Chosen to Implement a Global Real-Time Product Information Management System at World's Largest Forest Products Company. Jul. 11, 2005. Business Wire. p. 1.*

(Continued)

*Primary Examiner* — F. Zeender
*Assistant Examiner* — Fawaad Haider
(74) *Attorney, Agent, or Firm* — Fish & Richardson P.C.

(57) ABSTRACT

Third party certification using enhanced claim validation, in which identification information uniquely identifying an item that has moved through a node in a supply chain is received and event data associated with the uniquely identified item is received from the node based on receiving the identification information. The process also includes performing a third party validation of an associated characteristic of the uniquely identified item based on the received event data, and providing a third party certification of the associated characteristic based on performing the third party validation.

22 Claims, 17 Drawing Sheets

U.S. PATENT DOCUMENTS

| | | |
|---|---|---|
| 2008/0154417 A1 | 6/2008 | Srikumar et al. |
| 2010/0114780 A1 | 5/2010 | Tribe et al. |

FOREIGN PATENT DOCUMENTS

| | | |
|---|---|---|
| WO | WO 01 48651 | 7/2001 |
| WO | WO 01 93036 | 12/2001 |

OTHER PUBLICATIONS

Wilson, T.P. et al "Feed Safety and Traceability in the Agricultural Supply Chain: Using the Internet to deliver Traceability" Supply Chain Management, vol. 3, N3, (Mar. 1998) pp. 127-133.

Trienekens, J.H. "Production management and Information architectures in the food suplly chain" Challenges for Information Management in a World Economy, Proceedings of Unformation Resources Management Association International Conference, May 29, 2996, pp. 232-239.

U.S. Non-Final Office Action for U.S. Appl. No. 12/343,857 dated Jul. 13, 2011, 28 pages.

U.S. Non-Final Office Action for U.S. Appl. No. 12/062,088 dated Dec. 27, 2010, 15 pages.

\* cited by examiner

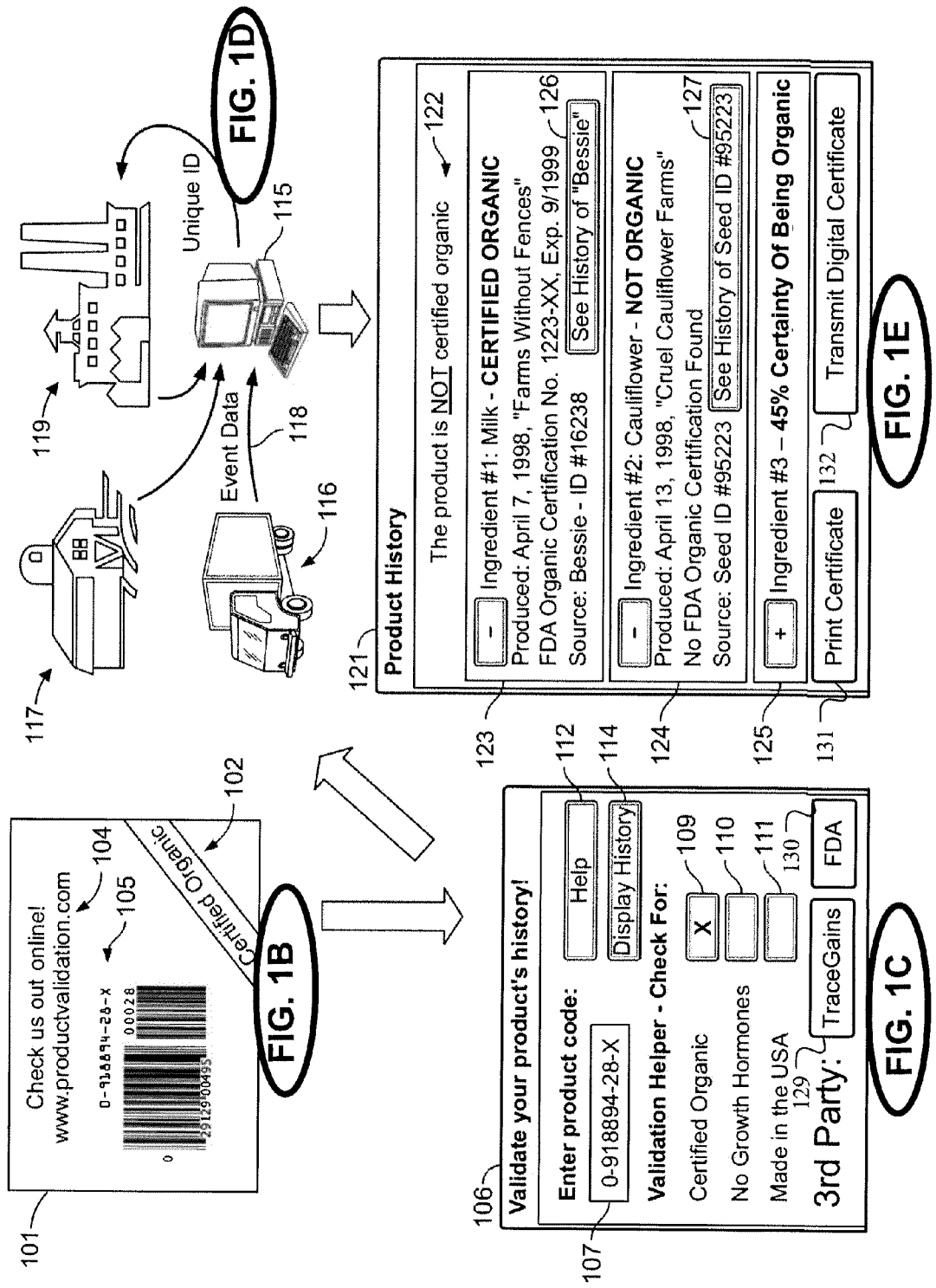

FIG. 9A

AgInfoLink Source and Age Verification Report

Report Date: 9/7/2007
TOTAL HEAD COUNT = 15

The animals listed below are enrolled in the AgInfoLink's USDA Approved Process Verified Program. If you have questions, contact AgInfoLink at 800.287.8787 or pvp@aginfolink.com

| EID | Birth Date | Source Verified* | EID | Birth Date | Source Verified* |
|---|---|---|---|---|---|
| 942000000281972 | 1/23/2006 | Yes | 942000000284605 | 1/23/2006 | Yes |
| 942000000284778 | 1/23/2006 | Yes | 942000000286956 | 1/23/2006 | Yes |
| 942000000288897 | 1/23/2006 | Yes | 942000000301923 | 1/23/2006 | Yes |
| 942000000316174 | 1/23/2006 | Yes | 942000000334873 | 1/23/2006 | Yes |
| 942000000335195 | 1/23/2006 | Yes | 982000063394918 | 3/5/2006 | Yes |
| 982000062508222 | 3/5/2006 | Yes | 982000081812407 | 2/20/2006 | Yes |
| 982000081812408 | 2/20/2006 | Yes | 982000081812410 | 3/17/2006 | Yes |
| 982000081812411 | 4/10/2006 | Yes | | | |

AgInfoLink is a USDA Process Verified Company

FIG. 9B

THIRD-PARTY CERTIFICATION USING ENHANCED CLAIM VALIDATION

CROSS-REFERENCE TO RELATED APPLICATION

This application claims the benefit of U.S. Provisional Patent Application Nos. 61/022,192, filed Jan. 18, 2008, and 61/085,711, filed Aug. 1, 2008, which are each incorporated herein by reference.

FIELD

The present disclosure generally relates to the tracking of items in a supply chain.

BACKGROUND

In response to recent recalls of consumer products, such as food, toys, pet food, clothing and toothpaste, as well as scares relating to E. coli and bovine spongiform encephalopathy (BSE, or "mad cow") contamination of beef, the average consumer has become acutely aware of a lack of transparency in product supply chains, particularly supply chains that cross international borders.

Even after being notified of a product recall or scare, a consumer has few options other than to discard all items that could potentially be affected, or to risk their own health and safety by continuing to consume or use the potentially affected items. Alternatively, a consumer may choose to blindly trust a particular brand, believing that brand to be sufficiently reputable to look after the consumer's welfare. Thus, the concomitant ignorance that results from the lack of transparency in the supply chain often leads to misplaced confidence or to unnecessary, wasteful knee-jerk reactions.

In the case where a supplier has taken appropriate precautions to safeguard an item in their care, there is typically no mechanism for an end-user to verify these safeguards without performing an invasive or impractical on-site inspection, or an expensive audit. All of these factors may lead consumers to feel generally unsettled about the items they wish to purchase, potentially decreasing the price that a supplier may charge for a high-quality product, and thus presenting a barrier to trade and commerce.

SUMMARY

The apparent lack of product safety that consumers perceive from these latest incidents have influenced consumers to be more wary of the safety of the products they use and consume. While a consumer previously may have trusted particular brands, or inspectors within supply chains to ensure the safety of products, consumers now want to be able to determine for themselves whether a product is safe or appropriate for use or consumption, or whether the product lives up to its claims.

According to the present disclosure, a user can enter information that uniquely identifies an item into a user interface in order to validate a claim (such as a label claim) associated with the item, in real time or near real time. Based on the identifying information, nodes in a supply chain are polled or queried for event data or other information regarding the item, and the event data is appropriately reformatted and automatically compared against the claim. In addition to or instead of outputting the raw event data itself, the user interface may output indicia that validates or invalidates the claim, thereby rendering the supply chain for the uniquely identified item more completely transparent.

Furthermore, the polling of event data from the nodes of the supply chain and the validation or invalidation of the claim may be performed by a trusted third party certification entity, such as a government agency or agent of the government, a religious organization, or a consumer safety, advocacy or other organization. The results of the validation may be filtered, such as to remove information identifying a supplier, and provided to an end-user, to the owner of the item, or to a vendor selling the item, for example to justify an increased selling price of the item.

According to one general implementation, a computer-implemented process includes receiving identification information uniquely identifying an item that has moved through a node in a supply chain, and receiving, from the node, event data associated with the uniquely identified item based on receiving the identification information. The process also includes performing a third party validation of an associated characteristic of the uniquely identified item based on the received event data, and providing a third party certification of the associated characteristic based on performing the third party validation.

Implementations may include one or more of the following features. For instance, the third party validation may be performed in real time or near real time to receiving the identification information. The identification information may be received over a network from a second node in the supply chain. The third party validation may be a process verification, or an age and source verification. The item may be livestock. Providing the third party certification may further include providing a physical or digital certificate identifying the item and indicating that a third party has validated the associated characteristic.

In other examples, a user selection of the trusted third party from among several trusted third parties to perform the third party validation may be received, where the third party validation is performed by the user-selected trusted third party. The third party validation may be a process verification, an ownership verification, an age verification, a shelf-life or expiry date verification, or a source verification. The item may be a received material or finished good.

In additional examples, the certificate may be provided to an owner, a potential purchaser, or a seller of the item. The identification information may identify a group of items including the item, and the third party validation may be performed for each item of the group. Providing the third party certification may further include identifying a non-conforming item of the group whose associated characteristic is invalidated, and identifying a conforming item of the group whose associated characteristic is validated.

In other examples, the identification information may be received from a first entity (e.g. an owner of the item), the node may be associated with a second, different entity (e.g. a manufacturer of the time, other than the seller), the third party validation may be performed by third, different entity (e.g. a trusted consumer advocacy organization), and the third party certification may be provided to a fourth, different entity (e.g. a purchaser or vendor). The process may also include transmitting data operable to generate a user interface for receiving the identification information.

In further examples, the identification information may further identify the associated characteristic or claim. The process may also include transmitting a query to the node requesting the event data, the query comprising the identification information. Performing the third party validation may include applying a rule to the received event data. The third party certification may identify a statistical likelihood that the associated characteristic is valid. The associated characteristic may be an ingredient-free characteristic. Performing the third party validation may further include identifying a component of the uniquely identified item using the received event data, and performing the third party validation on the identified component. The associated characteristic may describe a recall status or a warranty status.

According to another general implementation, a computer-readable medium is encoded with a computer program including instructions that, when executed, operate to cause a computer to perform operations including receiving identification information uniquely identifying an item that has moved through a node in a supply chain, and receiving, from the node, event data associated with the uniquely identified item based on receiving the identification information. The operations also include performing a third party validation of an associated characteristic of the uniquely identified item based on the received event data, and providing a third party certification of the associated characteristic based on performing the third party validation.

According to another general implementation, a device includes an interface configured to receive identification information uniquely identifying an item that has moved through a node in a supply chain, to receive, from the node, event data associated with the uniquely identified item based on receiving the identification information, and to provide a third party certification of the associated characteristic based on performing a third party validation of an associated characteristic of the uniquely identified item. The device also includes a processor configured to perform the third party validation of the associated characteristic of the uniquely identified item based on the received event data.

According to a further general implementation, a system includes one or more computers, and a computer-readable medium coupled to the one or more computers having instructions stored thereon which, when executed by the one or more computers, causes the one or more computers to perform certain operations. The operations include receiving identification information uniquely identifying an item that has moved through a node in a supply chain, and receiving, from the node, event data associated with the uniquely identified item based on receiving the identification information. The operations also include performing a third party validation of an associated characteristic of the uniquely identified item based on the received event data, and providing a third party certification of the associated characteristic based on performing the third party validation.

According to another general implementation, a system includes one or more computers, and a computer-readable medium coupled to the one or more computers having instructions stored thereon which, when executed by the one or more computers, cause the one or more computers to perform operations. The operations include receiving identification information uniquely identifying an item that has moved through a node in a supply chain, and receiving, from the node, event data associated with the uniquely identified item based on receiving the identification information. The operations also include performing a third party validation of an associated characteristic of the uniquely identified item based on the received event data, and providing a third party certification of the associated characteristic based on performing the third party validation.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 1A to 1E are conceptual diagrams of exemplary systems for providing third party certification using enhanced claim validation.

FIGS. 5 to 10 illustrate exemplary user interfaces for entering identification information and outputting event information that validates a claim.

In the drawings, common reference numbers refer to corresponding parts throughout.

DETAILED DESCRIPTION

Figure 1A:
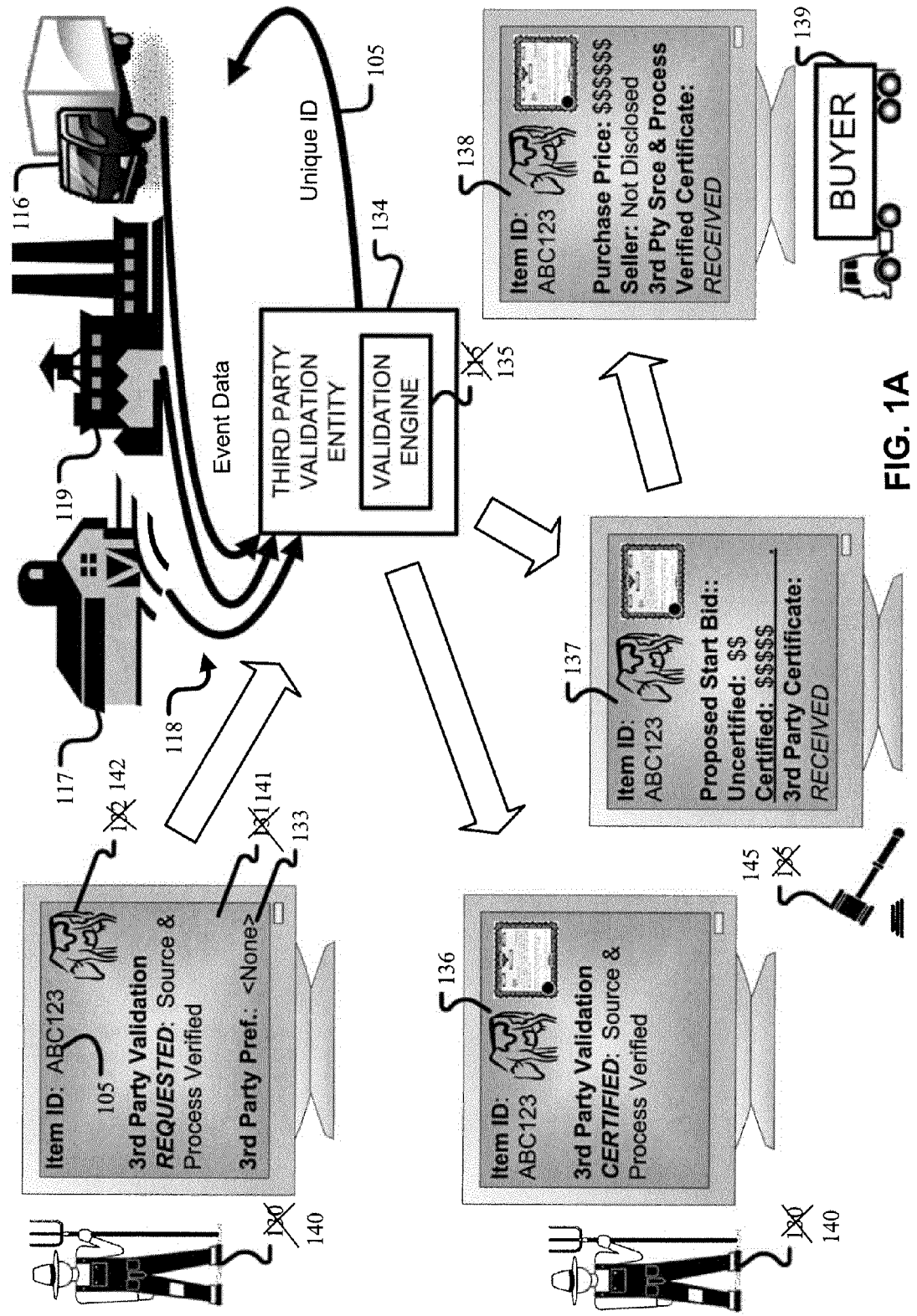

Using the enhanced claim validation approach described herein, consumers of a product may research the supply chain history of a product in real-time or near real-time, in order to detect false claims and make well-informed decisions regarding whether the item is worthy, safe, or appropriate for consumption, transportation or other use. Using this approach, a consumer may avoid the unintentional consumption or use of items that are unfit or unsafe, that originate from suppliers that make inaccurate claims, or do not comply with their moral, ethical, religious values or deep-seated personal preferences, for example where the item's label makes an intentionally or unintentionally false claim.

Specifically, a user can enter information that uniquely identifies an item into a user interface in order to validate a claim (such as a label claim) or other characteristic or condition associated with the item, in real time or near real time. Based on the identifying information, nodes in a supply chain may be polled or queried for event data or other information regarding the item, and the event data may be appropriately reformatted and automatically compared against the claim. In addition to or instead of outputting the raw event data itself, the user interface may output indicia that validates or invalidates the claim, thereby rendering the supply chain for the uniquely identified item more completely transparent.

Moreover, the polling of event data from the nodes of the supply chain and the validation or invalidation of the claim may be performed by a trusted third party certification entity, such as a government agency or agent of the government, charity, a religious organization, or a consumer safety, advocacy, not-for-profit or other organization. The results of the validation may be filtered, such as to delete information identifying a seller, and provided to an end-user, to the owner of the item, or to a vendor selling the item, for example to justify an increased selling price of the item.

The indicia that validates or invalidates the claim may include physical indicia, such as a printed certificate, or intangible indicia, such as a digital certificate, approval, cryptographic key, or data indicating that a modeled business process may proceed to a next operation. Since the indicia may assist a purchase decision and increase the value of the item, an origin, owner or vendor of the item may use the third party certification to support a higher selling price.

FIGS. 1A and 1B to 1E are conceptual diagrams of exemplary systems for providing third party certification using enhanced claim validation, such as a validation of a characteristic or "label claim." Initially, according to one implementation, a "label claim" is intended to refer to a claim, or an assertion of something as a fact, associated with a "label" or "mark," which is an affixed, impressed or otherwise associated device, symbol, inscription, etc., serving to give information, identify, indicate origin or ownership, attest to character, aspect, quality or comparative merit, or the like, as a trademark, of an item that has moved through at least a portion of a supply chain.

While such a claim may be included on a physical label attached to a physical item, the claim need not be physically embodied (e.g. may be a contract provision or a verbal claim), may not be attached to the item, and may be associated with an item that is also not itself physically embodied (e.g. a data file). Contract provisions, claims and provisions may be automatically or manually extracted from contract files stored on the system, or may be derived or inferred from past behavior between parties.

"Real time" and "near real time" refer to instantaneous or near instantaneous processing, where a user of the system perceives no delay or merely a short delay between the time information is requested and the time information is provided. Although near real time access to data may refer to access that occurs within a few seconds or minutes for complex queries or using systems with limited computational resources, near real time access to data may take longer. In any case, near real time access is contrasted with systems require a user to wait for extended periods of time, that require manual intervention, collation or analysis, that allow a user to perceive onerous or extended delays, or that require a user to participate in multiple computing sessions before results are output.

Although the automatic validation of claims is described in many examples herein as occurring in real time or near real time, in other examples longer (including much longer) time frames are contemplated. For instance, in other exemplary implementations the validation of a claim may invoke a manual processing operation which may cause the claim to be validated over the course of several days. Moreover, the claim validation result or certification may be "output" to the user on paper via postal mail or in person, in which the result may take days, weeks or months. Moreover, while many examples provided herein describe the validation of a label claim, other types of claims, assertions, obligations, rights, requirements, characteristics or qualities of an item or item may also be validated or invalidated using these enhanced techniques, by either the party requesting the certification, by third party trusted entities, or by other agents.

Naturally then, an "item" may refer to one or more tangible or intangible article or commodity, while a "supply chain" may refer to a sequence of processes or operations at one or more locations (e.g. nodes) involved in the production and distribution of the article or commodity. Within the supply chain, the item or article may undergo a series of state transformations, such as where the item is transformed from a living state to a non-living state, where the item is processed from a first product into a second product, where the item is divided into constituent parts or into multiple products, or where the item is combined with other items. The item may be a received material or finished good At various stages of the supply chain, items or groups of items, or different states of the same item, may be identified using one or more assigned, unique identifiers. Supply chain processes may assign new, modified or replacement identifiers to items that have undergone certain processing operations, even if the item that exits the process and the item that enters the process (i.e., the 'origin' of the item exiting the process) may at least outwardly be the same, whole, identical item.

In addition to the situation where a one-to-one correspondence exists between the item exiting the process and the origin of that item, supply chain processing may add further identification complexities where, for example, unique items are blended into new items, a single unique item is separated into multiple discrete items, or where multiple overlapping unique identifiers are assigned to an item or to group in which the item is a part. Put another way, processing may cause an item to have more than one origin, or more than one item to have the same origin, and may thus have more than one assigned, unique identifier.

By way of example, an item may be a consumer product such as food or components of food, a toy, a consumer electronic device, a living plant or animal (e.g. livestock or seafood), a fluid, a container, a fruit or vegetable, a pharmaceutical, a vehicle, or a group, batch, lot, cluster, or other plurality of items. Similarly, the item may represent an intangible item, such as an electronic mail message, a virtual item in a virtual universe (such as a virtual item like a weapon, a good, or land purchased in the SECOND LIFE® or WORLD OF WARCRAFT® virtual universes), a right, a title, or an obligation. A group of items includes one or more similar or dissimilar items.

Using fruit as an example, a claim may be associated with a physical label that is affixed or attached to the fruit, or packaging for the fruit, a palette or other container that holds multiple fruit packages, or a truck or warehouse that transports or stores the fruit. The claim may be associated with a label that is not physically affixed to the fruit, such as an advertising banner that hangs over a shelf of fruit, or a verbal assertion made by a fruit hawker. The claim and/or a unique identifier of the item may be stored in an identification device, such as an RFID tag, affixed to the item. The claim may be associated in other ways as well, such as where a television commercial describes or infers that a product line of items each share a particular characteristic (i.e. "organic").

In any case, the label may make a claim that negatively or positively attests to some characteristic of the item. The claim may attest to the organic character of the item ("Certified Organic," "100% Organic," "Natural," "Guilt Free"); may address a warranty status ("Under Factory Warranty," "50,000 miles remaining under warranty"); may attest to the natural origin of the item ("Farm Raised," "No Artificial Colors Or Sweeteners," "Ocean Caught"); may attest that the item was not treated with hormones ("No Growth Hormone," "rbST negative"); may attest to the location of origin of the item ("Made in the U.S.A.," "Real California Cheese," "Factory Authorized," "Under Warranty"); may attest to the ingredients of the item ("Peanut free," "Contains Phenylalanine"); may assert that the item is vegetarian or vegan friendly ("Does not contain milk or eggs," "Flavored with soy-based simulated bacon"); may assert that the item is cruelty-free ("Product not tested on animals," "Simulated fur"); may be a drug claim that asserts that the item alters the physiology or function of any part of the human body ("Prevents erythema caused by sunburn"); may be a cosmetic claim that does not describe a physiological effect of the body ("Fragrance Free," "No Perfumes"); may address whether the item has ever been recalled; may assert that an animal that produced the item was not caged ("Cage-free," "Free Range"); may provide a temporal reference ("Fresh Caught," "One-Day-Old Bagels," "Our Seafood Swam In The Ocean Last Night," "Expires Mar. 15, 2008"); may attest to a storage or processing condition ("Fresh, Never Frozen," "Cold Filtered," Guaranteed Shipped under 50° F."); or may assert that the item is in compliance with a standard or has been approved by a body ("UL Listed," "IEEE-1394 compliant," "Union Labor," "No Child Labor," "Authorized Transaction," "Good Housekeeping Seal Of Approval," "Oprah Book Club Selection," "Fair Trade," "Process Verified," "Source & Age Verified" "ISO-9000/14000 compliant" "Lean Six Sigma"). In short, a claim can be any assertion about anything, and may be associated with an item in any number of ways.

Each item is associated with data (or a data structure) that describes, among other things, a unique identifier of the item, and event data which may be used to verify a characteristic of the item such as the known or possible origin or origins of the item. The data may be stored on a medium that is physically attached to the item, such a Radio Frequency IDentification (RFID) tag attached to the item or to a container that includes the item, without requiring an RFID reader to call, query or write to a separate database. In another example, the data may be handwritten on sourcing papers or labels affixed to the item, such that a human reader of the sourcing papers may manually identify the origin of the item, and manually update the information (i.e. with a pen or other writing implement). Other media that may be physically attached to the item may include a cattle bolus, or a bar-code. This same media may also make a label claim.

As the item traverses through the supply chain, event data and identification data associated with the item may be updated as the item undergoes processing operations such as aggregation, sorting, transformation or commingling, and label claims may be added. For instance, if first and second items are combined to produce a third item, an RFID tag associated with the third item may be written with event data which uniquely identifies the first, second and third items, as well as origin information describing the first and second items as the origin of the third item. Alternatively, new papers may be generated for the third item on which this same identification and origin information, as well as claim information, is printed. It may be that an accurate label claim may become inaccurate, for example when an organic item is commingling with a non-organic item. In these cases, event data associated with the commingling event may be used to invalidate the inaccurate label claim, even if the label itself us not updated.

Alternatively, the data associated with the an item may be stored in a database that is cross-referenced with identifying information that uniquely identifies the item. For instance, a node in a supply chain may access or download, from an immediately preceding node in a supply chain, a database or table which includes identifying data (e.g. a stock keeping unit (SKU) plus another identifier, an item name or code number, or a vehicle identification number (VIN)) which uniquely identifies the item and possibly characteristics of the third item. In addition to the identifying data, the database or table may include event data describing past events that have occurred on each identified item, where the event data may be used to validate claims. In this regard, as the item passes through the supply chain, the amount of associated event data increases unless filtering or deletion of the event data occurs. For instance, a node may wish to hide the origin of the item or a price associated with a particular transaction between nodes, by deleting event data.

Starting with the upper left portion of FIG. 1A, a first entity user 140 (in this case, a farmer) who owns an item (in this case, a cow) enters a unique item identifier 105 ("ABC123") and a type of third party validation requested ("Source & Process Verified") into a user interface 141. Other information or data may also be provided in the user interface 141. For example, a picture 142 of the item may be displayed within the user interface when the item identifier 105 is input (e.g. to increase accuracy), or the user 130 may select a preferred trusted third party 133 from among several trusted third parties to perform the validation (e.g. to increase confidence in the validation, thereby increasing a selling price of the item).

The item identifier 105, either alone or with other data such as the type of third party validation requested, is transmitted to a third party validation entity 134, which may be a selected third party, a preferred third party, or a third party associated with the type of validation requested. The third party validation entity 134 may be a trusted governmental or non-governmental entity that certifies compliance or characteristics of the item. The third party validation entity queries various nodes of a supply chain in real time or near real time to gather event data or other information stored at one or more nodes that relate to events associated with the submitted unique item identifier.

In the illustrated example, the third party validation entity 134 may query or poll a vehicle 116 that transported the item, a farm 117 that raised or harvested the item, a factory 119 that processed the item, or any other node. In an alternate implementation, at least a portion of the event data may already be stored at the third party validation entity 134 prior to the commencement of the third party validation, such that no externally polling or querying is required (i.e. only an internal data lookup is required). For instance, the third party validation entity 134 may be a data warehouse where event data is initially stored when the item is traversing the supply chain. Specifically, the third party validation entity 134 may be a node in the supply chain, or may be associated with a node in the supply chain.

Using a rule-based validation engine 135, the third party validation entity validates a characteristic of the item, and provides an indicia of the validation, such as a physical or digital certificate, which may be provided back to the user 140, a vendor 145 of the item, or to other entities. The user 140 may view the certificate using user interface 136, which indicates that the "Source & Process Verified" validation has been completed. The vendor 145 may view the certificate using the user interface 137 and, as shown, may adjust the price of the item upwards accordingly. In one example, the certificate is, sent as an email attachment to specified recipient parties, or the certificate is presented as a web page which may be accessed by parties who are notified of its existence or who may navigate to it using a search engine. In another example, the certificate is a dynamically generated Portable Document Format (PDF) file.

Upon selling the item to a buyer 139, the vendor 145 may pass the item, the filtered event data associated with the item, and the certificate to the buyer 139. The buyer's user interface 138 notes the receipt of the certificate, however the previous owner of the item is shown as "undisclosed" since the vendor 145 filtered identification information which identified the user 140. In any regard, since the certificate has been validated by the third party validation entity 134 and not, for example, by the vendor 145 or the user 140, the buyer 139 need not trust parties involved in the transaction of the item who may have an adverse interest to the buyer 139, or who may be motivated to make false claims regarding the item.

By filtering the event data while at the same time passing along the certificate to the buyer 139, the vendor 145 can provide an assurance to the buyer 139 that the item satisfies its claims without identifying the source or origin of the user 140. In hiding the user's identity, the vendor 145 can prevent the buyer 139 from contacting the user 140 directly for other transactions, cutting the vendor 145 out of future deals.

FIGS. 1B-1E provide additional context to the approach of FIG. 1A, by illustrating several specific, exemplary user interfaces which may be used by the owner 140, the vendor 145, or by other parties such as the buyer 139 in effecting a third party validation. As illustrated in FIG. 1B, a label 101 affixed to the packaging of an item or to the item itself includes a claim 102 (in this case, a label claim), that asserts that the item is "Certified Organic." To be certified as an organic food, generally it must be shown that use of synthetic chemical inputs (e.g. fertilizer, pesticides, antibiotics, food additives, etc) and genetically modified organisms has been avoided; that farmland has been used that has been free from chemicals for a number of years (often, three or more); that an audit trail of detailed written production and sales records has been established; that strict physical separation of organic products from non-certified products has been established and respected; and that periodic on-site inspections have occurred.

The qualities or characteristics that make a food item "organic" or, conversely, preclude a food item from being called "organic" may be encoded using rules, such that a condition that a food item whose supply chain event history satisfies or does not satisfy the rule may be validated or invalidated as an organic item, thereby validating or invalidating a claim. A rule that requires, for instance, that the farm be free of chemicals would be violated by first event data received from a first source in real time that indicates that a particular farm is the origin of the item, and second event data received from a second source in real time that indicates that the particular farm received pesticide treatment with a particular period of time.

While an owner or vendor of an item be motivated to falsely market a non-organic item as organic, a third party entity such as a consumer advocacy group or health food organization may have the competing motivation to expose suppliers who make these false claims. In this regard, in performing a claim validation, an end-user may benefit by placing their trust in the third party instead of the supplier, and may be likely to receive a more accurate (or at least more conservative) analysis. In any case, by providing the option of performing a third party validation in addition to an interested-party validation, the enhanced approach described herein gives the consumer additional choices, and allows the user to select an approach that they deem to be best for them.

In order for the user to validate the claim, the label 101 includes a validation resource 104 (such as a Uniform Resource Locator (URL) or a telephone number), as well as a unique identifier 105 ("0-918894-28-X") that uniquely identifies the item or collection of items. The user may be a living or automated end-user of the product (such as a consumer), or the user may some other entity disposed at the origin or mid-point of the supply chain. Although the term "validation" is used herein throughout to generally refer to a process for determining whether a claim is accurate, the "validation" process may support an approval, an authentication, an authorization, a certification, a confirmation, a corroboration, endorsement, a legitimization, ratification, a sanction, a substantiation, or a verification.

As illustrated in FIG. 1C, using a user interface 106, the user enters the unique identifier 105 into text box 107, and selects the type of claim that the user wishes to validate. For instance, the user checks "Certified Organic" checkbox 109 to verify the validity of the "Certified Organic" claim 102. Although the label does not explicitly make a "No Growth Hormone" or "Made In The USA" claim, the user could also select checkboxes 110 and 111, respectively, to verify whether those claims could be made for the item. Although the selection of a claim to validate is illustrated in this example as a manual process, in other arrangements the enhanced claim validation approach may automatically determine claims that may apply (or be "appropriate") to a item, based on receiving the unique identifier 105, or appropriate unique identifiers of products may be automatically determined based on receiving a selection of a claim that is to be satisfied.

Using a help control 112, the user may seek automated assistance. In one example, the automated assistance function may access a database that stores a graphic that displays where the unique identifier 105 is located for various items, that stores a textual description of the location of the unique identifier 105, or that directs the user to a technical support specialist or a community of users, or initiates an on-line chat session. Once the unique identifier 105 is entered into the text box 107, the user can select a "display history" form submission control 114.

The user interface may also include controls (e.g. controls 129 and 130) which allow the user to select an entity to perform the claim validation. For instance, selection of the control 129 may cause the validation to be performed by TraceGains® (a private company), and selection of the control 130 may cause the validation to be performed by the Food and Drug Administration of the United States Government. Failure to select an entity to perform the claim validation may cause the validation to occur using an interested party, using a default, preferred or random entity, or using an entity associated with the type of claim validation requested. For instance, a query of look-up table may determine that a "halal" claim should be validated by a religious entity or charity as the trusted third party (as compared, for example, to a meatpacking council or an automobile association, who may have no interest in providing, or experience or knowledge to provide, an accurate validation).

Upon detecting that the form submission control 114 has been selected, a transaction database 115 (e.g., as illustrated in FIG. 1D) queries various nodes of a supply chain in real time or near real time to gather event data or other information stored at one or more nodes that relate to events associated with the submitted unique identifier 105. The transaction database 115 may be, for example, a database of the user, or of a third party or other validation entity. For instance, the transaction database 115 may query or poll a vehicle 116 that transported the item, a farm 117 that raised or harvested the item, a factory 119 that processed the item, a governmental or non-governmental entity that certifies compliance of the item, or any other node. The transaction database 115 may operate under control of an interested party (such as a node of within the supply chain of the item), or under the control of a third party who may or may not be trusted or disinterested.

It may occur that the transaction database 115 queries all nodes in the supply chain, or the transaction database 115 may query a portion of the nodes in the supply chain based on the unique identifier entered. In addition, a trusted third party may select a subset of the nodes in the supply chain that the trusted third party itself deems to be trusted, and may filter out or ignore nodes that, for example, have historically provided inaccurate or conflicting data. In an alternate implementation, at least a portion of the event data is stored at the third party validation entity 134 before the validation begins, such that no externally polling or querying is required (i.e. only an internal data lookup is required). For instance, the third party validation entity 134 may be a data warehouse where event data is initially stored when the item is traversing the supply chain, or a central data repository. Moreover, the third party validation entity 134 may be a node in the supply chain, or may be associated with a node in the supply chain.

Furthermore, it may occur that the transaction database 115 queries a first node or set of nodes in the supply chain, processes received data, and subsequently queries a second or further node or set of nodes. For example, if the first query receives event data identifying an origin of an item, a second or subsequent query of a supply chain or non-supply chain node (such as a governmental node) may reveal information pertaining to the origin of the item. If the origin is a farm or a manufacturing facility, for example, these cascading queries could be used to determine if the origin is certified by a governmental agency or other certification body.

For each of the nodes that store event data relating to the item, event data 120 (or an indicia of the occurrence or non-occurrence of an event, or the existence or non-existence of event data 120), are transmitted from each node to the transaction database 115. Since the events may be stored in various data formats, the transaction database 115 reformats the data to a unified data format, such as a format based on extensible Markup Language (XML), and transmits the reformatted event data to the user. Furthermore, it may automatically determined whether the item satisfies the claim 102, based on the received event data 118, or the user may be given the option of manually validating the received event data 118 itself. The events in the transaction database 207 may also be stored in a relational table format within an SQL database.

As illustrated in FIG. 1E, the reformatted event data is output on a user interface 121 to thereby validate or invalidate the claim. Specifically, based on the automatic determination, the user interface 121 includes indicia 122 that indicates that this item does not satisfy the claim, in that the item is not certified organic. The indicia may be a "yes" or "no" type indicia that indicates that the claim is or is not validated, the indicia may display a probability that the claim is or is not validated, or raw event data or other data may be output.

The indicia may also be a physical or digital certificate or other mark of authenticity. For instance, selection of the control 131 may allow the user to print out a physical certificate validating the claim. Selection of the control 132 may bring up another menu which allows the user to transmit a digital certificate, or provide access to a digital certificate, as well as some or all of the event data received at the transaction database 116. The user can bring this certificate to the auction house to receive an additional premium on items identified as compliant.

"Yes" or "no" ('binary') type indicia can be output if the claim is determined to be 100% valid or 100% invalid, or a threshold can be preset, set by a manufacturer or user, or automatically determined based on past use, where the threshold allows a claim to be validated or invalidated even if some event data is missing or contradicts the validation or invalidation. For instance, if event data indicates that only 5% of a farm has been sprayed for pesticides and a threshold of 90% certainty has been set by the user, the enhanced claim validation application may output an indicia that an item had not been sprayed for pesticides even though there is a small chance that the item has been sprayed. Such a threshold is helpful since it may be impossible or impractical to prove or disprove a claim with 100% certainty, while different users may desire different levels of confidence.

In addition to displaying event data for the item itself, the user interface 121 displays historical event data for each component, constituent part, ingredient, or previous state or phase of the item. For instance, the user interface 121 includes expanding regions 123, 124 and 125 that display or otherwise output event data for three ingredients of the item. The expanding region 123 displays production event data ("Produced: Apr. 7, 1998"); origin location event data ("Farms Without Fences"); governmental certification compliance event data ("FDA Organic Certification No. 1223-XX, Exp. 911999); and pre-transformation event data ("Source: Bessie—ID #16238").

Since 'Ingredient #1,' which is displayed in expanding region 123, is milk, the user may wish to view event data regarding the source of the milk or, more generically, the product that was transformed to produce the item or ingredient. Since the pre-transformation product is a cow ("Bessie") which also has a unique identifier ("16238"), the user may select a control 126 to see the event history of the cow. For instance, although the expanding region 123 indicates that the milk is certified organic based on governmental certification compliance event data, the user may effectively treat that event data as a claim, and may investigate the validity of that claim as well, in a similar manner as they investigated the end product.

In that regard, the user may investigate the supply chain of any uniquely identified items though an iterative, recursive, or retrospective process. Specifically, products, and then components or previous states or phases of those products, are validated from end-point to origin-point, notwithstanding the fact that the uniquely identified items may change their nature or state through supply chain processes, or that certain intermediate phases or states may be not uniquely identifiable or unidentifiable.

The expanding region 124 displays event data for the ingredient "cauliflower," which was used in the production of the uniquely identified item. Since event data relating to an FDA organic certification of the cauliflower was not found, the item is then not deemed to be certified organic based on the application of a rule or upon reviewing event data, and the claim 102 is thereby invalidated by this event data. As above, since the event data includes a unique identifier ("Seed ID #95223") of the cauliflower, the user may select a control 127 to research the event history of the cauliflower in turn.

In summary, a user can enter information that uniquely identifies an item into a user interface, in order to validate a claim associated with the item, in real time or near real time. Based on the identifying information, nodes in a supply chain are polled or queried for event data or other information regarding the item, and the event data is appropriately reformatted, and automatically compared against the claim. In addition to outputting the raw event data itself, the user interface outputs indicia to validate or invalidate the claim, thereby rendering the supply chain for the uniquely identified item completely transparent. Such processing may occur using a disinterested, trusted third party, or interested parties in a transaction, or any combination thereof.

FIG. 1, supra, and FIGS. 5 to 10, infra illustrate various user interfaces for validating claims, which are implemented using various controls or widgets, that each allow for different levels of interaction and functionality. In each case, it is noted that the particular controls used, and the particular functionalities allowed, are merely exemplary. For the sake of brevity, it is further noted that any user interface that allows for the input of identification information and the output of claim validation information may be used, and that the selection of particular components, controls, widgets or functionalities generally depends upon the intended user of the user interface, and the level of control desired.

Figure 2:
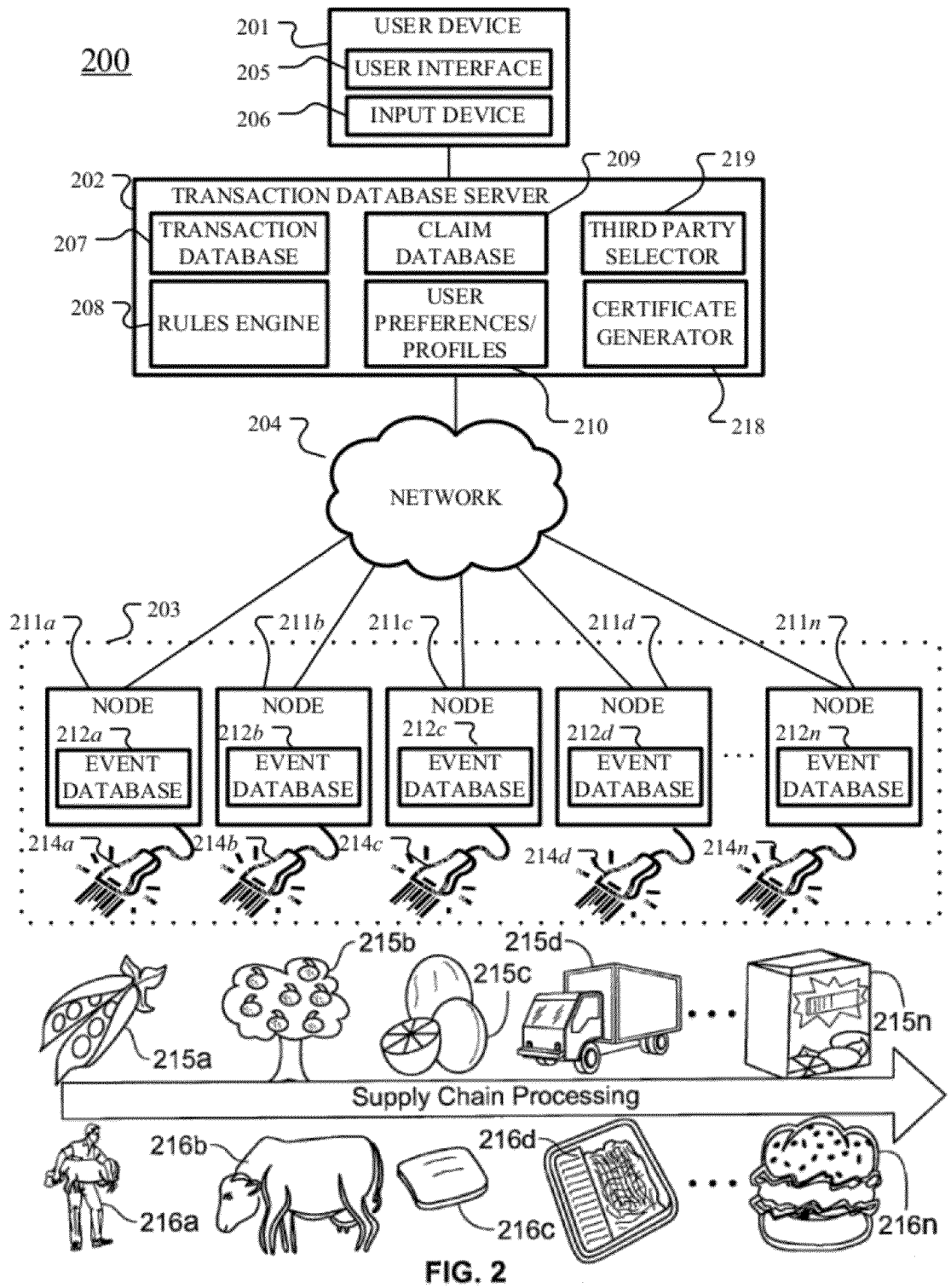
FIG. 2 is a block diagram of an exemplary system for validating a claim.

FIG. 2 is a block diagram of an exemplary system 200 for validating a claim. Briefly, the system includes a user device 201, and a transaction database server 202 connected to nodes of a supply chain 203 via a network 204. Using the system 200, a user may investigate the validity of a claim associated with an item that has been processed by the supply chain 203, thereby making the supply chain 203 increasingly transparent. From the perspective of suppliers in the supply chain, transparency in the supply chain, backed up by third party trust assurances, allow suppliers to increase prices of goods which have been processed under higher standards.

In more detail, and among other things, the user device 201 includes a user interface 205, such as a display or haptic device or a speaker, that outputs textual, touch, sound or graphical data to the user, including event data that validates the claim, or certifications of these validations provided by third parties. The user device also includes an input device 206, such as a mouse, a keypad, an RFID reader, a bar code scanner, a microphone, a telephone, cell phone, a gaming system or console, personal digital assistant (PDA), digital picture frame, a device equipped with a camera, gyroscope or accelerometer, or other input mechanism, that receives or accepts commands from the user or an automated system.

The transaction database server 202 includes a transaction database 207 that stores events associated with items in the supply chain, as well as addresses or identifiers of resources external to the transaction database server 202 that also store events. The transaction database server 202 may be under the control of a trusted third party.

In one example implementation, the events in the transaction database 207 are stored in a uniform event storage format, such as an XML-based format, while externally stored events may be stored in various event storage formats, including proprietary event storage formats. The transaction database 207 may also store indicia received from nodes of the supply chain 203 that indicate whether or not a particular item has or has not, or is likely to have had or had not, been processed at a particular node or within a particular supply chain. The transaction database 207 may re-format event data received from various nodes in the supply chain which exists in non-standard or proprietary formats. In another example, the events in the transaction database 207 are stored in a relational table format within a database management system that is accessible using a Structured Query Language (i.e. in an SQL database).

Furthermore, the transaction database server 202 includes a rules engine 208 that allows the transaction database server to automatically validate or invalidate claims based on applying rules to received event data. For instance, for the claim "Never Frozen" may include a rule that requires all event data relating to a temperature reading event to be greater than 0° C. (32° F.), as a temperature reading at or below that temperature would indicate that the item may have frozen. Similarly, "stored cold, never frozen" products may be associated with a rule that requires all event date relating to temperature readings to be in a temperature range of greater than 0° C. (32° F.), but less than room temperature.

Although rules may be used to validate claims, in other cases the event data itself may provide sufficient to validate or invalidate a claim. For instance, event data itself may indicate that an item is organic or not organic. Since event data is self-serving and may itself be manipulated or falsified, however, the enhanced validation process may choose to ignore conclusory event data, may afford this type of event data lesser value, or may choose to use this event data only in certain circumstances. For instance, the enhanced validation process may ignore event data that indicates that an item is organic, but may use similar event data that indicates than an item is not organic.

Table 1, below, illustrates sample rules used to aid the interpretation of event data and to thereby validate claims.

TABLE 1

Sample Rules

| Claim | Rule: |
|---|---|
| Real California Cheese | Event = Milk Extraction Event Data (Location) = California; and Event = Processing Event Data (Location) = California. |
| No Growth Hormone | Event = Vaccination Event Data (Type) ≠ BGH, and Event Data (Type) ≠ rBGH, and Event Data (Type) ≠ BST, and Event Data (Type) ≠ rBST. |
| Made In Japan | Event = Manufacture Event Data (Factory Country) = Japan or Event Data (Factory City) = Osaka ... |
| Gluten Free | Event = Manufacture Event Data (Ingredient) ≠ Gluten, or Event Data (Ingredient) ≠ Gliadin, or Event Data (Ingredient) ≠ Glutenin. |
| Kosher Halal | Event = Slaughter Event Data (Slaughter Facility ID) = <certified facility>, and Event Data (Slaughter Personnel) = <certified individual>; and Event = Storage Event Data (Stored With) ≠ Milk. |
| Unscented | Event = Manufacture Event Data (Ingredient) ≠ "fragrance" or "perfume" |

The transaction database server 202 also includes a claim database 209 (or a claim engine, similar to the rules engine 208) that identifies item types based on input identification information, and that further determines appropriate claims to validate for identified item types. Where a user supplies identification information for an item but does not supply a claim to validate, the claim database may determine the type of item that the user is referring to based upon the content or format of the identification information, and may automatically or dynamically select one or more claims to validate without querying the user for additional information.

In addition to or instead of storing appropriate claims for identified items, the claim database 209 may also store known claims associated with specific items. For instance, if a clothing retailer may proudly assert that none of their clothing is made using child labor, then the claim database 209 may automatically associate (or invoke rules which associate) a "No Child Labor" claim with all items manufactured or sold by the clothing retailer. As such, if, as so commonly happens, the retailer itself is not aware that its subcontractors are illegally using child labor, the enhanced claim validation application may assist with detecting this impropriety in every case that identification information for any of the retailer's products is input. Alternatively, the claims database 209 (or claims engine) may be a database listing items (by their unique identifiers) that are compliant with certain claims.

The transaction database server 202 may also store user preferences/profiles 210, which include explicitly provided or inferentially determined information concerning the user using the enhanced claim validation application. For instance, a vegetarian or a person who practices a certain religion may explicitly denote that they want all food items checked for meat content or, similarly, through continued selection of a "vegetarian" claim validation function, the enhanced claim validation application may infer (based on rules stored in the rules engine 208) that a particular user is a vegetarian and that a vegetarian claim validation function is always to be run for food items. As with other components of the transaction database server 202, the user preferences/profiles are optional and may be omitted.

The user preferences/profiles 210 may also describe an authorization level of a user to view certain event data. For instance, a generic consumer may given authorization to view an automatically determined claim validation result, while a wholesaler or middleman may be given authorization to view more granular data, such as pricing or sales volume event data. Certain users may be assigned authorization levels which do not allow them to perform claim validations at all. The user preferences/profiles 210 may also specify trusted third parties who, by default, are to perform claim validations.

Other authorization levels may allow validations to be run, but for results to be output only if a claim is validated or invalidated. For instance, a company may effectively allow users to check the company's internal processes by allowing them to run claim validations, but may output an error message to the user and deliver invalidating claim result to the company if a claim turns out to be invalid. This type of selective authorization may allow a company time to get ahead of a potentially damaging story if, for circumstances outside of the company's control, a customer would otherwise discover that a claim is invalid.

The transaction database server may also include a certificate generator 218 for generating physical or digital certificates, as well as a third party selector 219 for selecting third parties for performing validations in the absence of an explicit user selection. The third party selector may include a look-up table which outputs a third party (or a hierarchy of third parties) based on various input factors, such as item SKU, type of validation requested, past accuracy, level of trust, and other information.

The supply chain 203 includes any number of nodes, such as nodes 211a to 211n. Each node includes an event database, such as event databases 212a to 212n, that each store events associated with items in the supply chain 203. Furthermore, nodes may include input devices (such as bar code readers 214a to 214n). For instance, the node 211b may store events read by bar code reader 214b or other input devices associated with the node 211b, or the node 211b may store events read by other nodes, such as nodes 211a and/or 211n.

As items are transported through and processed by the supply chain 203, events are generated and stored, thereby providing a tracking history for each event. In one example, the supply chain 203 may be used to track items that do not undergo any state changes or transformations, such as a supply chain that receives a finished product, processes the finished product, and transfers out the finished product to outside of the supply chain 203. In another example, the supply chain 203 is used to track items that undergo state changes or transformations, such as a transformation that changes the item from a living state to a non-living state, or that changes the item from a first product to an Nth product (N being any integer) derived from the first product. In this latter example, the stored events can be used to trace the processing history of the Nth product through to the first product, for the purpose of validating a claim relating to the Nth product or the first product, and for other purposes.

As shown in FIG. 2, items 215 and 216 undergo several state or phase transformations within the supply chain. For instance, seeds 215a are processed at the node 211a, while a tree 215b that grows from seeds 215a is processed at the node 211b, a fruit 215c that grows on the tree 215b is processed at the node 211c, a container 215d of the fruit 215c is processed at the node 211d, and juice 215n made with the fruit from the container 215d (including the fruit 215c) is processed at the node 211n. Since the validation of a label claim on the juice box that stores the juice 215n may benefit from or require event data from stored events associated with the seeds 215a, the juice 215n in the juice box and the seeds 215a are considered to be one "item," in various forms, phases or states. More particularly, the seeds 215a and the tree 215b are considered to be living forms or versions of the item 215, while the harvested fruit 215c and the juice 215n in the juice box are considered to be non-living forms or versions of the item 215. In each instance, supra and infra, where a particular item is mentioned, reference is also intended to be made to groups of similar or dissimilar items.

As long as the seeds 215a (or groups of seeds), the tree 215b (or groups of trees), the fruit 215c (or groups of fruit), the container 215d (or groups of containers), and the juice 215n (or multiple batches of juice) are each associated with a unique identification number (or a unique identifier can be inferred or estimated, for example, based on a grouping of an item under consideration), the item 215 can be iteratively tracked through its initial state, based on event data associated with later states. For instance, in accessing event data or validating a claim associated with the juice 215n, the user or enhanced claim validation application may determine that the juice was conveyed the uniquely identifiable container 215d.

In subsequently accessing the transportation history event data of the container 215d, the user or transactional database server may determine that the container 215d contains uniquely identifiable fruit 215c, which may be subsequently determined to come from a uniquely identifiable tree 215b, which was planted using uniquely identifiable seeds 215a. In another implementation, the item 215 can be iteratively tracked through its initial state even if an intermediate state is not identified or identifiable.

In this regard, the entire event history of the item is made transparent to a user, by linking together various subsequent phases or states of a product with previous uniquely identifiable phases or states. As such complex claim validation routines or processes may be performed on later states or phases of an item, to determine whether earlier states or phases of the item met certain conditions. Specifically, a user could enter a unique identifier associated with the juice 215n to determine whether, in violation of a claim, contract requirement, or personal ethos, the seeds 215a were planted using migrant farm workers.

Using the unique identifier, the transaction database server queries and accesses event data of the juice 215n to iteratively access the unique identification information of the container 215d, then the fruit 215c, then the tree 215b, then the seeds 215a, then determine based planting event data queried based on the unique identifier of the seeds 215a, event information exposing the identity of the planter of the seeds 215a. Based on this accessed event information, the claim, contract requirement, or moral restriction could be manually or automatically validated by an interested or disinterested, trusted or non-trusted party.

If a middle phase or state of the item 215, such as the fruit 215c, does not have a unique identifier, it is still possible for the transaction database server to estimate the unique identifier of a previous phase or state of the item, and to make a guess regarding whether the claim is valid. If the validity of the claim is not ascertained with complete certainty, an indication as such may also be output to the user. Using the fruit example, the transaction database server may determine, based on the unique identity of the fruit $215c$ that the fruit $215c$ came from a uniquely identifiable farm that included uniquely identifiable trees, but the unique identification information of the tree that the fruit $215c$ was harvested from may be missing.

By querying nodes using the unique identifier of the farm itself, that is the unique identifier of the entity that encompasses or includes all possible trees, the transaction database server may determine a probability of each uniquely identifiable tree on the farm being the tree from which the fruit $215c$ was harvested and, consequently, the probability that particular, uniquely identifiable seeds that eventually grew into the identified trees were the source of the fruit $215c$.

Further, the enhanced claim validation application may cohort the trees, by grouping together those trees that were grown from uniquely identifiable batches of seeds, and generate a likelihood or probability that the fruit $215c$ was harvested from a particular, uniquely identifiable seed batch based on the number and size of each tree cohort. Despite the fact that event data is gathered for multiple or various states or phases of the item 215, the event data for the earliest desired or available phase or state of the item 215 is gathered in real time to receiving the identification information for the latest phase or state of the item.

Figure 11:
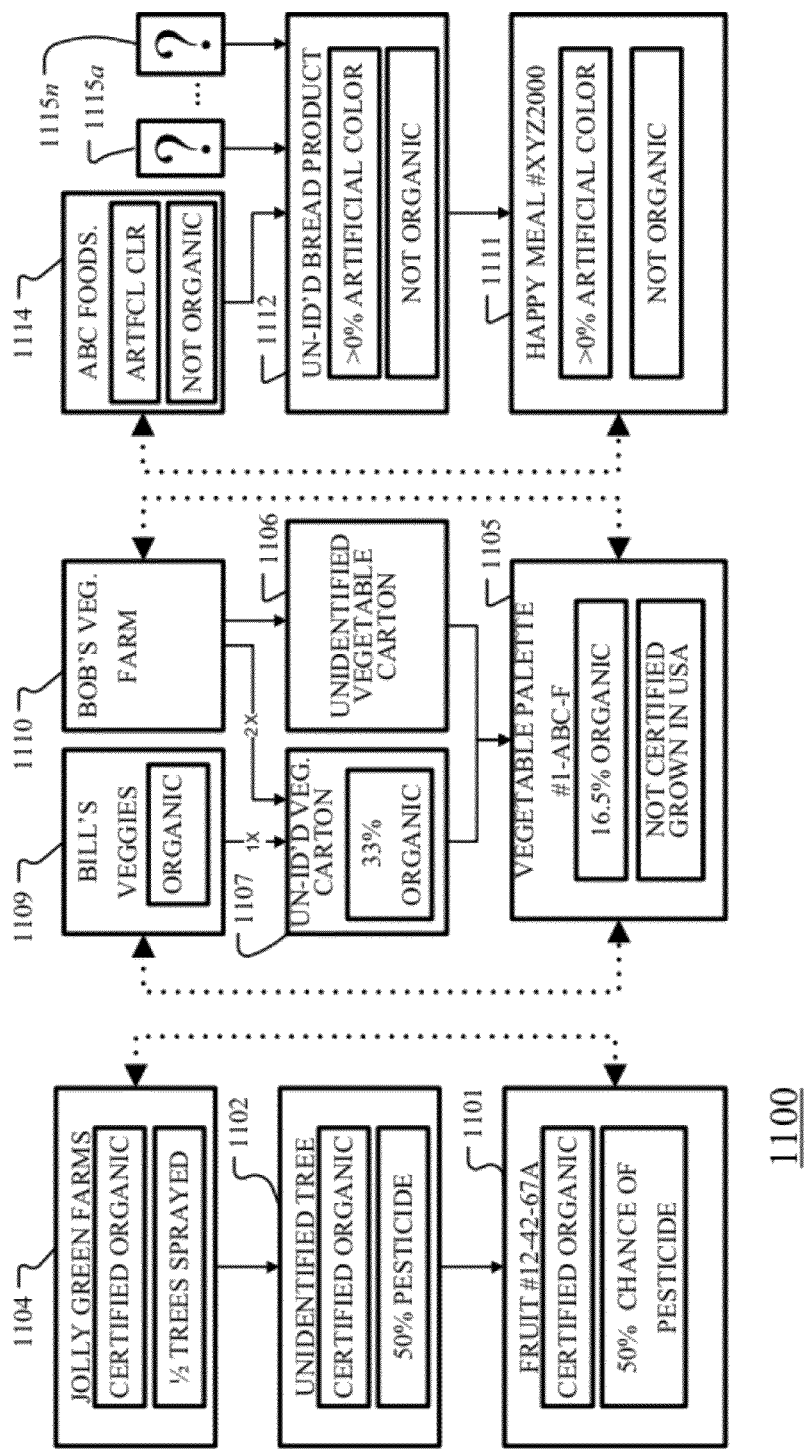
FIG. 11 provides examples of the automatic determination of a characteristic of an item where an earlier state of the item is unidentifiable.

Referring ahead briefly, FIG. 11 provides several examples of how a characteristic, trait, condition, or quality of an item can be automatically determined or deduced when an earlier state, origin, or ingredient of the item is unavailable or unidentifiable. In a first scenario, a uniquely identifiable fruit 1101 has been harvested from an unidentifiable tree 1102, however event data indicates that the identifiable fruit 1102 originated from identifiable farm 1104 or that the unidentifiable tree 1102 grew on the identifiable farm 1104. Characteristics or traits of an item (the fruit 1101) may still be determined if the item necessarily originated from another identifiable origin, source, state or item (the farm 1104).

Ignoring for a moment any factual inconsistency resulting from a origin potentially having these two example characteristics, event data associated with the farm 1104 indicates that the farm 1104 is certified organic, and that half of the trees have been sprayed with pesticides. Despite the fact that the tree 1102 is unidentified, it can still be automatically determined that the fruit 1102 also is certified organic and that it has a 50% probability of pesticide application since it necessarily originated from the farm 1104. This information may be displayed to a user via a user interface, or may be applied to a rule in the rule engine to validate a claim.

In a second scenario, a uniquely identifiable palette 1105 packages unidentified cartons 1106 and 1107 of vegetables that came from one of two sources, farms 1109 and 1110. Although it is not possible to uniquely identify the cartons 1106 and 1107, it is possible to automatically determine characteristics (or probabilities of characteristics) of the palette 1105 if the characteristics of all of the possible sources or origins are known. For instance, event data associated with the farm 1109 indicates that the farm 1109 is certified organic, and that the farm 1110 (which is not certified organic) provides twice as many vegetables into the packaging process of the carton 1107 as the farm 1109.

From this information, it can automatically be determined that vegetables stored the carton 1107 have a 33% chance of being from farm 1109, and thus have a 33% chance of being certified organic. Since the palette 1105 includes vegetable containers from a process that produced the carton 1107 as well as an equal number of vegetable containers from a process that produced the carton 1106 (which is known to originate from the farm 1110), it can be automatically determined that the vegetable palette 1105 includes vegetable cartons that have a 16.5% chance of coming from farm 1109, and thus have a 16.5% chance of being certified organic.

Thus, despite the fact that the cartons 1106 and 1107 are unidentified, it can still be automatically determined that there is some probability that the palette 1105 includes some organic vegetables. This information may be displayed to a user via a user interface, or may be applied to a rule in the rule engine to validate a claim. Since some claims, such as a "certified grown in the USA" label claim may require some affirmative event data to validate that claim, and since neither farms 1109 or 1110 include that characteristic, it may be definitively determined that the palette 1110 does not include vegetables that carry that certification.

In a third scenario, a uniquely identified food product 1111 is made from an unidentified bread product 1112 includes ingredients (such as flour, yeast, sesame seeds, etc.) that come identifiable manufacturer 1114 and multiple identifiable or unidentifiable sources $1115a$ to $1115n$. Event data associated with the identifiable manufacturer 1114 indicates that the manufacturer 1114 adds artificial colors to all of its ingredients, and that its ingredients are not organic. From this event data alone, regardless of the characteristics of the sources $1115a$ to $1115n$, it can be determined that the food product 1111 includes at least some artificial color, and is not organic. This information may be displayed to a user via a user interface, or may be applied to the rule engine to validate a claim.

Referring back to FIG. 2, calf $216a$ is processed at the node $211a$, while a cow $216b$ (representing the full-grown calf $216a$) is processed at the node $211b$. A carcass $216c$ of the cow $216b$ is processed at the node $211c$, ground beef $216d$ derived from the carcass $216c$ is processed at the node $211d$, and a hamburger $216n$ that is made from the ground beef $216d$ is processed at the node $211n$. Since the validation of a claim on the hamburger $216n$ may benefit from or require data from stored events associated with the calf $216a$, the hamburger $216n$ and the calf $216a$ are considered to be one "item," in various forms, phases or states. The calf $216a$ and the cow $216b$ are considered to be living forms, states, phases or versions of the item 216, while the carcass $216c$, the ground beef $216d$, and the hamburger $216n$ are considered to be non-living forms, states, phases or versions of the item 215.

As long as the calf $216a$, the cow $216b$, the carcass $216c$, the ground beef $216d$, and the hamburger $216n$ are each associated with a unique identification number, the item 216 can be iteratively tracked through its initial state, based on event data associated with later states. For instance, in accessing event data or validating a claim associated with the hamburger $216n$, the user or transactional database server may determine that the hamburger $216n$ was made with, among other things, the ground beef $216d$. In subsequently accessing the event data of the ground beef $216d$ (in addition to or instead of accessing the event data of other ingredients or components of the hamburger $216n$, such as the lettuce or the hamburger bun), the user or transactional database server itself may determine that the ground beef $216d$ came from the uniquely identifiable carcass $216c$, which may be subsequently determined to come from a uniquely identifiable cow $216b$, which grew from the uniquely identifiable calf $216a$.

In this regard, the entire event history of the item is made transparent to a user or the third party, by linking together various subsequent phases or states of a product with previous uniquely identifiable phases or states. As above, complex claim validation routines or processes may be performed on later states or phases of an item, to determine whether earlier states or phases of the item met certain conditions. Specifically, a user could enter a unique identifier associated with the hamburger 216n to determine whether, in violation of a label claim, contract requirement, or moral restriction, the calf 216a was ever treated with growth hormones, even if the intermediate phases were not affected by growth hormones.

Since the calf 216a was likely birthed by a cow which was also uniquely identifiable and was also associated with event data, the entry of a unique identifier for the hamburger 216n end product could in practice result in detailed information relating to events that occurred on the calf 216a that was processed into the ground beef 216d, as well as events relating to ancestors of the calf 216a. So, in addition to determining whether growth hormones were used on the calf 216a, to an extent limited only by available event data, it is also possible to determine whether any ancestor cow of the calf 216a was ever treated with growth hormone, thereby improving the confidence of an end-user that the hamburger 216d is hormone-free, as claimed by a label.

In any regard, using the unique identifier of the hamburger 216n, the transaction database server could query and access event data of the hamburger 216n to iteratively access the unique identification information of the ground beef 216d, then the carcass 216c, then the cow 216b, then the calf 216a, then determine based on vaccination or medical event data queried based on the unique identifier of the calf 216a, whether the calf 216a was ever treated with growth hormones. Based on this accessed event information, the claim, contract requirement, or user's moral restriction could be manually or automatically validated.

If a middle phase or state of the item 216, such as the carcass 216c, does not have a unique identifier, it is still possible for the transaction database server to estimate the unique identifier of a previous phase or state of the missing state or phase of the item, and to make a guess or estimate regarding whether the claim is valid. If the validity of the claim is not ascertained with complete certainty, an indication as such may also be output to the user. Using the hamburger example, the transaction database server may determine, based on the unique identity of the carcass 216c that the carcass 216c came from a uniquely identifiable ranch that included uniquely identifiable cows, but the unique identification information of the cow became the carcass 216c may be missing.

By querying nodes using the unique identifier of the ranch itself, that is the unique identifier of the entity that encompasses or includes all possible cows, the transaction database server may determine a probability of each uniquely identifiable cow on the ranch being the cow from which the carcass 216c was harvested and, consequently, the probability that particular, uniquely identifiable cows that eventually grew into the identified cows were the source of the carcass 216c.

Further, the transaction database server cohorts the carcasses, by grouping together those cows that were butchered from the uniquely identifiable calves raised on the ranch, and generates a likelihood or probability that the carcass 216c was butchered from a particular, uniquely identifiable calf (or group of calves, such as a group of calves including a calf under consideration). Despite the fact that event data is gathered for multiple or various states or phases of the item 216, the event data for the earliest desired or available phase or state of the item 216 is gathered in real time to receiving the identification information for the latest phase or state of the item.

While FIG. 2 illustrates items 215 and 216 undergoing relatively consecutive processing steps with regard to time and location, thereby altering the form, phase, or state of the item, in other example implementations processing via the various nodes 211 may occur over long periods of time, and may cover great distances. For instance, nodes 211 may be fixed or mobile, may track an item through years or decades of processing, and may be sited on different continents. Furthermore, events may occur to the items that may not be stored by nodes 211 of the supply chain 203.

Although FIG. 2 describes the user device 201, the transaction database server 202, and the nodes 211 as separate devices, this description is merely exemplary. In other implementations, the user device 201, the transaction database server 202 and/or nodes 211 of the supply chain 203 may be combined into one, two or more unified devices, or their functionalities may be combined or blended. For instance, the transaction database 207 may be stored on the user device 201 itself, and the user device 201 may read, generate, or otherwise access data from items in the supply chain using its own bar code scanner, radio frequency identification device (RFID) reader, or other input device.

Figure 3A:
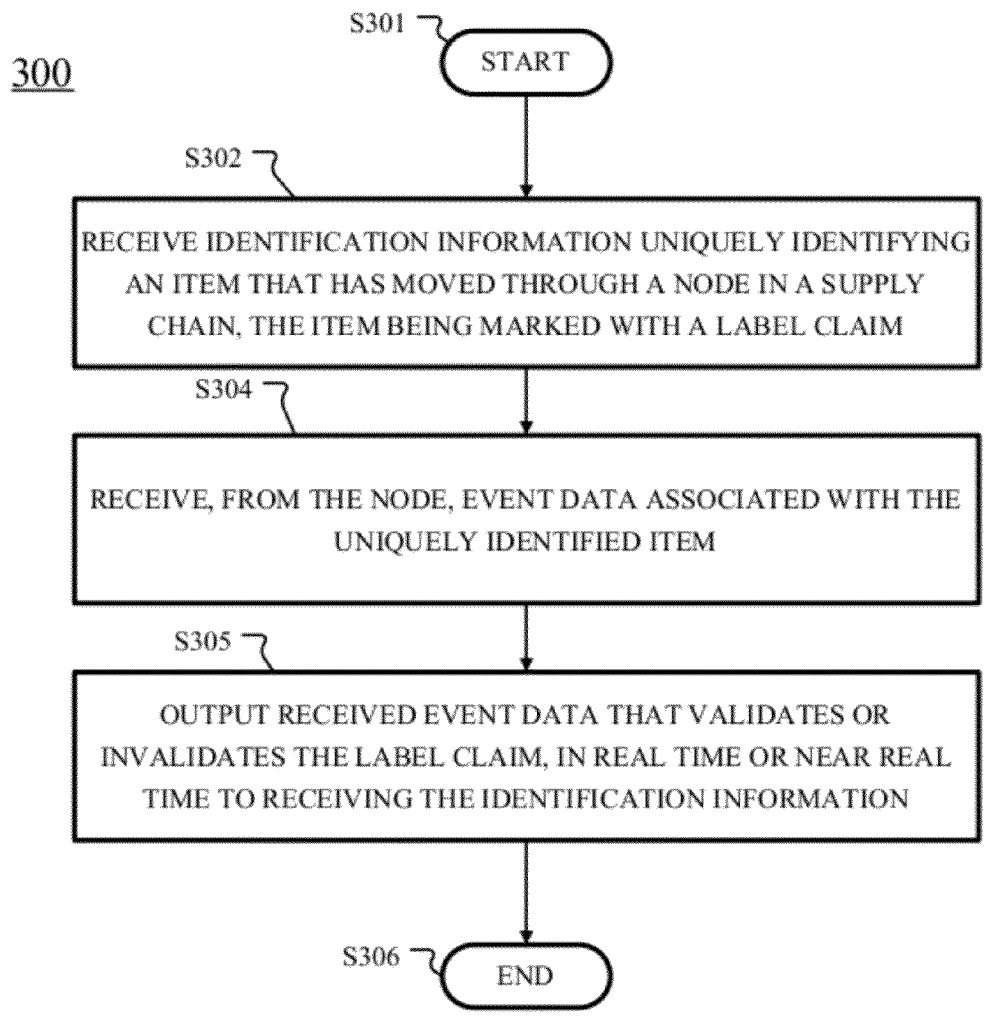
FIGS. 3A and 3B are flowcharts of processes for performing enhanced claim validation and third party certification, respectively.
Figure 3B:
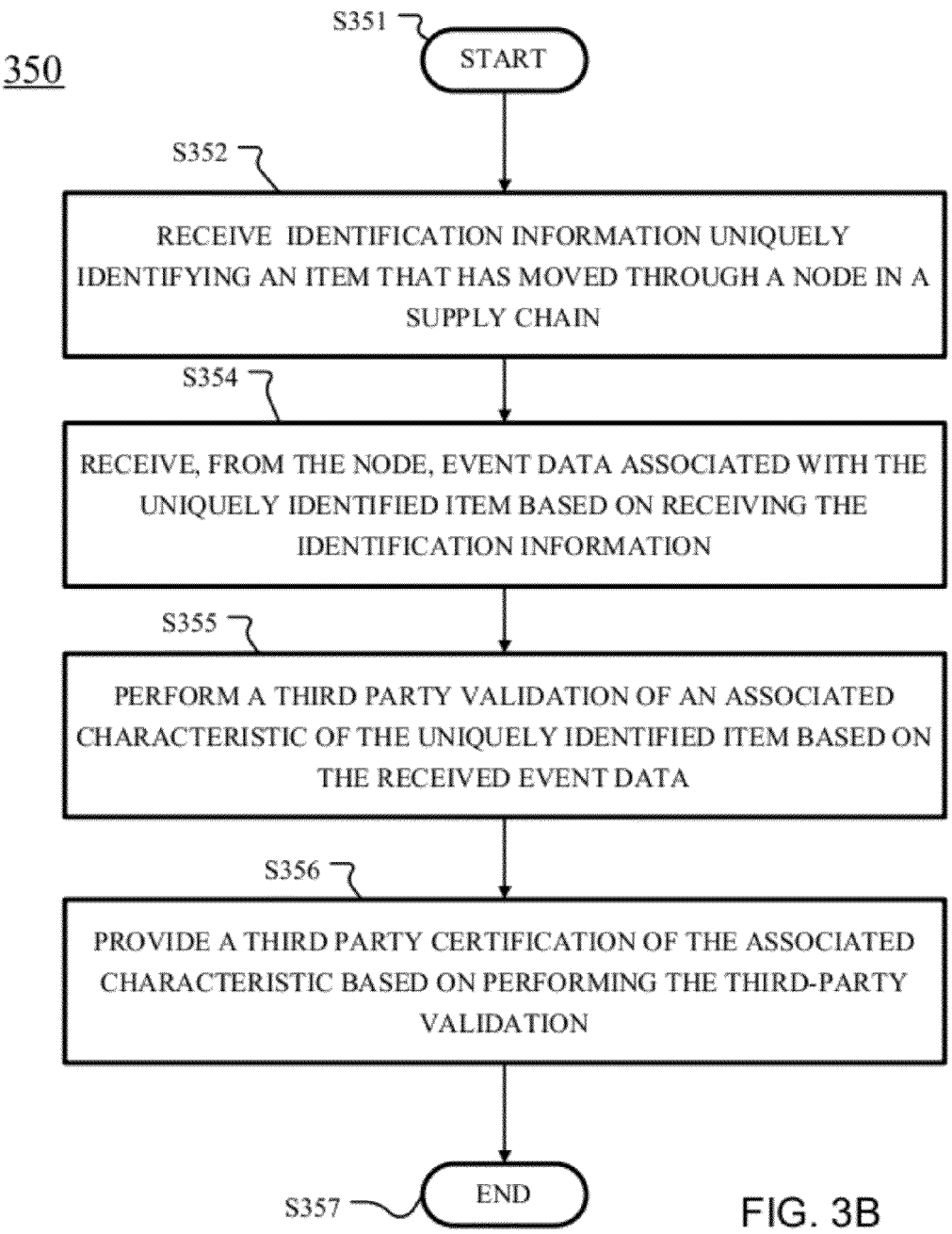

FIGS. 3A and 3B are flowcharts of processes for performing enhanced claim validation and third party certification. Briefly, in FIG. 3A, a computer-implemented process includes receiving identification information uniquely identifying an item that has moved through a node in a supply chain, the item being marked with a claim, and receiving, from the node, event data associated with the uniquely identified item. The process also includes outputting received event data that validates or invalidates the claim, in real time or near real time to receiving the identification information.

As noted above, a user can enter information that uniquely identifies an item into a user interface, in order to validate a claim associated with the item, in real time or near real time. Based on the identifying information, nodes in a supply chain are polled or queried for event data or other information regarding the item (e.g. by the user, a node of the supply chain, or a third party validation entity), and the event data is appropriately reformatted, and automatically compared against the claim. In addition to outputting the raw event data itself, the user interface outputs indicia to validate or invalidate the claim, thereby rendering the supply chain for the uniquely identified item more completely transparent.

Using the enhanced approach described herein, it is possible for a consumer to investigate whether a claim is false or deceiving. For instance, using a handheld computing device, a user may enter information that uniquely identifies an item, and be presented with raw historical event data associated with the item or components of the item, or with an analysis, interpretation or indicia based on the historical event data. Through this presented information, the customer can determine on their own or be shown whether a claim associated with the item is accurate and/or valid. Through this determination, the customer can alter their purchasing habits, and avoid the unwanted consumption or use of products that do not satisfy their associated claims.

In further detail, when process 300 begins (S301), identification information uniquely identifying an item that has moved through a node in a supply chain is received, the item being marked with a label claim (S302). The claim may be an "organic" label claim, a "natural" claim, a "no hormone" claim, a point-of-origin claim, an ingredients claim, a vegetarian contents claim, a "cruelty free" claim, a drug claim, a cosmetic claim, a "cage-free" claim, a brand claim, a trademark claim, a compliance claim, or any other claim regarding the character, nature or origin of the item. In addition to validating claims, the enhanced approach described herein can be used to verify whether contract terms have been satisfied, such as a contract term that requires particular sourcing, freshness, or other characteristic of an item.

Identification information refers to human-readable (e.g. a series of visible characters) or machine-readable data (e.g. a bar code) that distinguishes one item, or collection of items from another. For instance, a Stock Keeping Unit, (SKU), a Universal Product Code (UPC), an interim product identifier, a European Article Number (EAN), a Vehicle Identification Number (VIN), and a Global Trade Item Number (GTIN) are types of unique identifiers that are attached to an item, variant, product line, bundle, service or attachment. The identification information may be inscribed or incorporated onto the item itself, such as the case with a VIN, or the identification information may be located on packaging or an item label that is not an actual part of the item.

The identification information need not be physically or tangibly manifested. For example, the user may obtain identification information for a product via a telephone call with a customer service representative, or using an on-line database. For instance, a manufacturer may wish to limit a consumer's access to the event data or the claim validation information, and may provide the uniquely identifying information to the user only if the user calls a customer service representative with a complaint or request for information, and provides a time, date and location of purchase of the item. As indicated above, however, in many cases the identification information will be physically affixed to the item or packaging of the item, and the claim may be physically affixed to the item or packaging of the item, such as on a label.

The identification information may be associated with a single product or a group of products, or multiple, discrete identifying information can be received to identify a group of products. For instance, the identification information may represent batch identification information identifying a palette of items, or a container (such as a boxcar) of items, where the batch identification information may be mapped to or associated with the individual identification information identifying the individual items within the palette or container. Alternatively, the multiple individual identification information identifying individual items within a palette or container can be received instead of or in addition to the batch identification information that represents the group of individual items. Such functionality allows batches of items to be processed and validated at once.

More particularly, any process for arranging items into sets of items and, for example, creating and assigning identifying data to the set of items that may be different from data identifying an item within the set may be generically referred to as an 'aggregation' process. For example, at the end of a manufacturing transformation process, consumer goods may accumulate in a storage area and may be aggregated onto a palette, where the palette may be assigned an identifier that is different from any of the individual consumer goods.

Since the aggregation process may group items from different sources or potential sources, the aggregated item (e.g. the palette) is assigned data which links its with the known or potential sources of the component items (e.g. the items in the palette). The palette identifier is said to 'overlap' the individual item identifiers, because both exist at the same time and, while the item is palletized the item identifier may be used to track the palette, and the palette identifier may be used to track each item.

Figure 4:
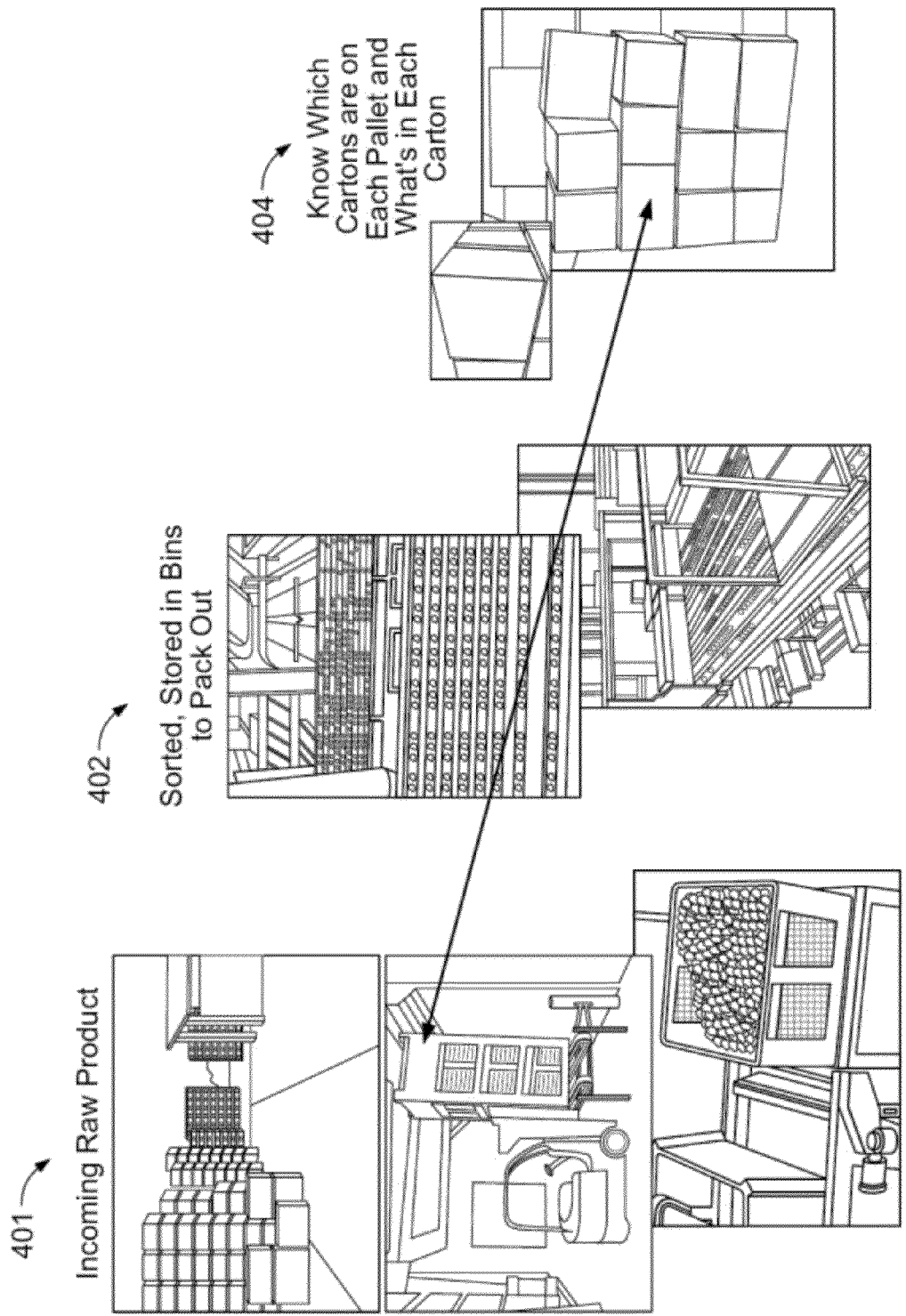
FIG. 4 provides a brief conceptual overview of a process for assigning a unique identifier to an item in a supply chain.

Referring ahead briefly, FIG. 4 provides a brief conceptual overview of a process for assigning a unique identifier to an item in a supply chain. An item, a group of items, or components of an item (collectively, "raw product") is received at an unique identifier assignment system (401). The unique identifier assignment system may or may not be within the supply chain itself, and thus may or may not perform processing functions aside from the assignment of the unique identifier.

Once received, the raw product is sorted, assigned a unique identification number, and in some cases, collectively sorted and stored (402). 'Sorting' generally refers to any process for selecting or arranging products or items into a particular sequence or category. In one example, sorting may include ordering items of the same kind in some ordered sequence (e.g. largest to smallest), or categorizing items with similar properties together (e.g., products separated by size). The sorting process may be accomplished in several ways, including an automated mechanical sorting process, a manual sorting process or combinations thereof.

Items such as animals, food, fluids, consumer goods or intangible items may be randomly sorted; sorted by gender, disposition, physical or mental characteristic, type, size, shape, weight, color, ripeness, temperature, receipt or expiration date or time, priority; sorted by physical characteristic or property such as density; sorted by intangible characteristic such as appeal or consumer demand; sorted based on regulatory requirements; or sorted by any other definable or indefinable characteristic, aspect or quality.

Although sorting may refer to a process for improving the order or categorization of items, the sorting process may also encompass 'unsorting,' in which the order or categorization of items is actually made worse. For instance, sorting may include combining a sorted bin of like items with an unsorted bin of dissimilar items, or randomly arranging items that are arranged in a particular order.

Sorting may introduce variation, uncertainty, randomness or other types of entropy into a supply chain, particularly from the standpoint of traceability. For instance, a uniquely identified container of fruit input to a sorting process may be associated with a particular characteristic. If the fruit is sorted by size into smaller sorted batches, the sorted batches would otherwise no longer be associated with that particular characteristic once they are separated from the uniquely identified container.

The raw product may be collectively stored or commingled before the unique identifier is assigned, such as in the case of fruit sold by the carton, or the raw product may be collectively stored after the unique identifier is assigned, such as in the case of a consumer electronic item that is palletized after a serial number is assigned. In any case, once the unique identifier has been assigned and the raw product has been stored collectively, it is possible to determine which items are stored with each other, and what items are in each storage unit (404). Through such an approach, each item in each carton or pallet may be linked to the origin of manufacture of the item.

As described and exemplified more fully below, 'commingling' refers to any mixing together of items or products derived from a single origin or from multiple origins. Mixing, accumulating, storing or combining together, or failing to prevent the natural occurrence of such mixing, are examples of ways to performing commingling. Once commingled, a randomly selected one (or unit) of the commingled items is indistinguishable from any other item, and thus the origin of the randomly selected item may be indiscernible with complete certainty.

Commingling may occur in a variety of ways, including an automated mechanical commingling process, a manual labor commingling process, a process which commingles items without involvement of a human or machine, or by some combination thereof. Items, including living, inanimate, or intangible items, may be randomly commingled with other items, or may be commingled or commingle themselves with like or dissimilar items based on any quality, characteristic, aspect, preference, or lack thereof. In several examples, fluids may be commingling by pouring two different fluids into a mixing vat; consumer products may be commingled by batching products from separate origins together prior to further processing; and animals may commingle themselves by wandering into separate pens.

In any regard, the unique identifier assignment process itself may generate event data that is associated with the item and stored. For instance, a unique identifier assignment event may include event data that describes the origin of the item, components of the item, the time or date when the unique identifier was assigned, unique identifiers that are stored or "cohorted" with the uniquely identified items, the unit of storage, the destination of the item after the occurrence of the unique identifier assignment event, or other data. Table 2, below, provides exemplary event data associated with a particular identifier and an exemplary unique identifier assignment event.

TABLE 2

Event Data Associated With A Particular Unique Identifier

| Event Name | Data | Data Type |
|---|---|---|
| IDENTIFIER ASSIGNMENT DATE | Mar. 3, 2007 | Date |
| ORIGIN | Freshfield Farms | Text |
| BATCH NUMBER | 1138 | Number |
| DESTINATION | Processing Facility #11 | Text |
| DEPARTURE DATE | Mar. 4, 2007 | Date |
| DEPARTURE TIME | 14:37:03 | Time |
| ASSIGNED CARTON | 3742 | Number |
| ASSIGNED PALLET | 1263 | Number |
| ITEM TYPE | Oranges, Delano | Text |

Figure 5:
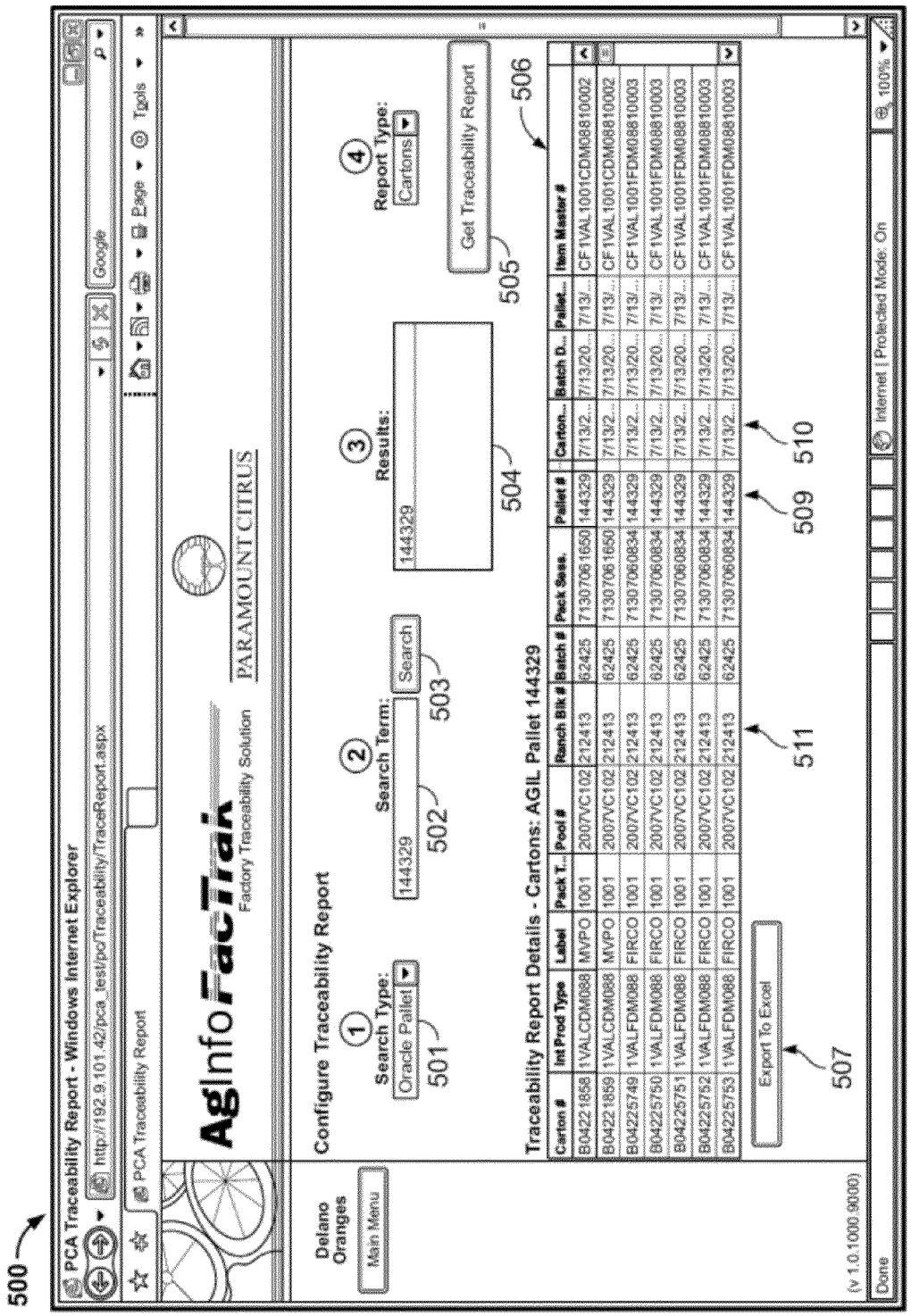
Figure 6:
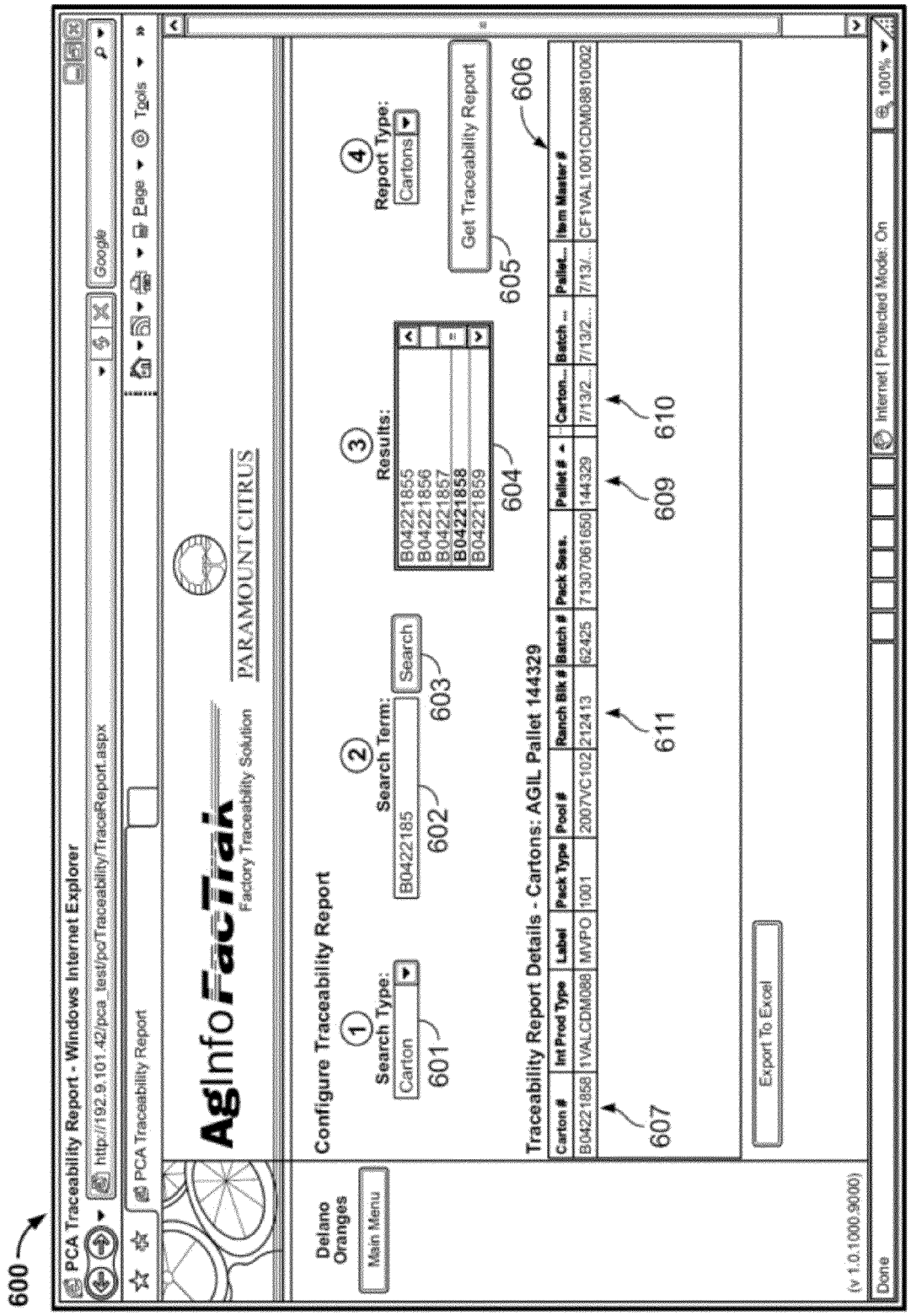

Receiving the identification information may further include generating a user interface, and receiving the identification information from a user via the generated user interface. FIGS. 5 and 6 illustrate exemplary user interfaces 500 and 600, respectively, for entering identification information and outputting event information.

The user interface 500 includes a search type control 501, which in this case is a drop-down control, that allows a user to select the type of identifier to search by. The user interface 500 also includes a search term control 502, which in this case is a text field, that allows the user to select which of the selected types they would like to view, as well as a search button control that executes the search. In FIG. 5, for example, by selecting the search button control 503, the user indicates that they wish to search by pallet identifier, and that they wish to view those pallets identified by the number "144329."

The results of the search are shown in the results window 504. Upon selecting identification information for a particular result and then selecting the "Get Traceability Report" button 505, event data matching the selected identification information is output in a window 506. In FIG. 5, for example, the event data output in the window 506 indicates the carton numbers (column 507) that match the selected pallet identification number (column 509).

As discussed in more detail below, the event data output in the window 506 may be automatically or manually analyzed to determine whether a claim is valid or accurate, in real time or near real time. For instance, if a produce wholesaler receives the pallet of oranges identified by identification number "144329" and searches for associated event data using the user interface 500, the information in column 510 may be used to refute a claim (or a contract requirement) that the oranges were packaged within the last three days.

The information in column 511, which identifies a source ranch of the items contained in the selected pallet, may be used by a user to refute a claim (or a contract requirement) that the oranges were grown or otherwise sourced at a particular farm, or a particular plot of a farm. The identification information for a carton of oranges can thus be used by a web-based system to obtain the traceability information on the exact product SKU, every pallet that the carton has ever been placed upon, and every ranch block number that provided one or more oranges contained within the carton.

In any regard, since the user interface 500 uses codes to identify various data elements, and displays data fields that a typical consumer many not be interested in viewing, it may be that the exemplary user interface 500 may be of the kind that is best suited for a sophisticated user, such as a wholesaler or commercial client. As described in more detail herein, other user interfaces (such as user interfaces 106 and 121) may be designed to provide more focused event data, to offer fewer options, or to provide an automatic analysis of the claim, and may thus be better suited for a consumer or other end user.

FIG. 6 illustrates a user interface 600 which, unlike user interface 500, performs a traceability search on an item based on a unique carton identifier, instead of a unique pallet identifier. The user interface 600 includes a search type control 601, which in this case is a drop-down control, that allows a user to select the type of identifier to search by. The user interface 600 also includes a text field search term control 602 that allows the user to select which of the selected types they would like to view, as well as a search button control that executes the search. In FIG. 6, for example, by selecting the search button control 603, the user indicates that they wish to search by carton identifier, and that they wish to view those cartons identified by the number "B0442185."

The results of the search are shown in the results window 604. Upon selecting identification information for a particular result in the results window 604 and then selecting the "Get Traceability Report" button 605, event data matching the selected identification information is output in a window 606. In FIG. 6, for example, the event data output in the window 606 indicates the identified carton number (column 607), and a pallet identifier that identifies a pallet upon which the identified carton was packed (column 609).

The event data output in the window 606 may be automatically or manually analyzed to determine whether a claim is valid or accurate, in real time or near real time to entering the identifier into the user interface. For instance, if a produce wholesaler receives the carton of oranges identified by identification number "B0442185" and searches for associated event data using the user interface 600, the information in column 610 may be used to refute a claim (or a contract requirement) that the oranges were packaged within the last three days, and the information in column 611, which identifies a source ranch of the items contained in the selected pallet, may be used by a user to refute a claim (or a contract requirement) that the oranges were grown or otherwise sourced at a particular farm, or a particular plot of a farm.

The identification information may be received manually, such as by using a keyboard, mouse, or voice input, or automatically using a radio frequency identification device (RFID) reader, a barcode scanner, or any other mechanisms that effects the efficient input of identification information.

Returning now to FIG. 3, event data associated with the uniquely identified item is received from the node (S304).

The unique identification number is used as the basis for a query of the nodes in the supply chain, in order to receive all or a portion of the event data relating to events experienced by the identified item during its processing and movement through the supply chain. In a simple example, a query is sent to all nodes that are in communication with a transaction database server, requesting that all event databases be searched for information relating to the entered identification information. The event data may be received at a transaction database controlled by the user, or by a selected or default trusted third party entity.

Based on receiving this query, the nodes may access the event databases using a look-up table, index, or other mechanism, and output event data associated with the identification information. This output event data is then sent back to the transaction database server for reformatting, collation, processing, analysis, and/or further transmission or output. Event data associated with the uniquely identified item may be received from a second, third, or Nth node, and the event data received from the nodes may be reformatted.

In additional implementations, the transaction database server may store information indicating that the item has definitely passed through, or definitely not passed through certain nodes. This would apply in a situation where, upon processing an item, a node sends a message to the transaction database server that particular items have been processed and that event data has been stored at the node, or has not yet been processed and that event data is not yet stored.

In this situation, the transaction database server may not query each node with which the server is in communication, but may rather automatically determine which servers are known to store event data, or which servers are known to store event data relevant to the claim validation, and query selected nodes based on this automatic determination. For instance, if the transaction database server stores information that indicates that a certain farm stores information for a produce item relating to a seed planting event and a produce harvesting event, the transaction database may query or poll nodes associated with that farm to determine the source or origin of the produce item, and may not query or poll nodes associated with other farms in an effort to receive event data relating to seed planting and produce harvesting events. If a trusted third party entity is performing the validation, the trusted third party may choose to only query those nodes which the trusted third party entity itself considers to be trusted.

In an additional example, the transaction database server may store information for each node relating to the types of hardware or software used by the nodes, and may format queries appropriately, or may generate queries that will cause the nodes to format data according to a preferred format of the transaction database server. As it is expected that event data will be stored on a large variety of systems, including systems that implement legacy, obsolete, or proprietary query engines, the ability to effectively communicate with these systems and to gather event data across multiple systems is beneficial. In this regard, a data collection interface is established between the node and a transaction database, the data collection interface allowing the transaction database to receive the event data associated with the uniquely identified item from the node.

In a further example, the transaction database server may itself store event data, such as the case where nodes send indicia to the transaction database server that an item has been processed, such that the identification information is received before or after the event data is received from the node. This may also be the case where the transaction database server itself exists within a node of the supply chain. In these instances, the transaction database server may avoid querying the individual nodes, to avoid the duplication of event data and to reduce computational expense.

If no response is received by the query, the transaction database may default to a condition in which it is assumed that no event data is stored at the queried node, or the node may be re-queried. A historical query response rate may be used to aid this determination, such that a node that affirmatively responds to a majority of queries, including queries that result in an indication that no event data is stored, may be requeried if no response is received to an initial query.

In an additional example, the transaction database server may merely polls those nodes in the supply chain, or types of nodes in the supply chain, that would be relevant to the claim validation. For instance, if the claim associated with processed meat relates to process that the animal was slaughtered, such as a "Kosher" or a "Halal" claim, the transaction database server may merely poll nodes associated with slaughterhouses for event data relating to the identified processed meat item. In this regard, the transaction database server may choose to not query other nodes, such as nodes that store birthing, vaccination, or transportation event data but not slaughtering event data that would confirm or otherwise validate the "Kosher" or "Halal" claim.

The event data received from the queried nodes may relate to any event data stored at the node, to event data relating to the identified item only, to a movement of or a particular supply chain processing of the uniquely identified item at the node, to event data that was generated within a particular time period, only to event data that is relevant to the validation of the claim, or the event data may relate to other factors.

The event data itself may represent an event identification number attribute, a type attribute, a nomenclature attribute, a quantity attribute, a unit-of measurement attribute, a parent event identification number attribute, or a child event identification number attribute, and may be associated with a vaccination event, a harvesting event, a birthing event, or a transportation event, a treatment event, a planting event, a location event, a containering event, or a cohorting event.

Received event data that validates or invalidates the claim is output in real time or near real time to receiving the identification information (S305), and the process 300 ends (S306). As illustrated above with respect to FIGS. 5 and 6, the received event data that validates or invalidates the claim may include all of the event data that was received at the transaction database server from the queried nodes, or a subset of all of the received event data.

Continuing with the example described above, for instance, if the claim is a "kosher" or "halal" claim on processed meat and the transaction database server receives event data from numerous nodes including nodes that store event data unrelated to the slaughtering process, the transaction database server may filter the received event data, and merely output germane event data, such as event data received from a slaughterhouse node, or event data that specifically validates or invalidates the label claim.

As the transaction database server is configured, adapted, or is operable to receive data from multiple nodes or data sources that may each use their own language, specification or data format, the transaction database server may effect the output of received event data received from the various nodes by establishing a data conversion interface between the output device and the transaction database, the data conversion interface allowing the output of the received event data from the transaction database using the output device.

Instead of or in addition to outputting received event data that validates or invalidates the claim, the transaction database server may automatically validate or invalidate the claim itself, and output an indicia of the validity or invalidity of the claim itself. The indicia may include an explicit statement on a printed certificate, such as "The Label Claim Has Been Validated," or "The Item Has Been Made In the U.S.A."

Alternatively, the claim may be validated inferentially, such as were information or indicia is only provided when the claim is valid or invalid, or where the probability that the claim is valid or invalid exceeds or does not exceed a threshold. If certification (such as third party certification) occurs as part of a business process flow, the act of certification may merely involve setting a binary flag associated with a unique identifier from one state (a non-certified state) to another state (a certified state), thereby allowing the remainder of the process flow to occur.

In any case, a user may input the claim to validate manually, or the transaction database server may automatically determine which claims to automatically validate or invalidate. For instance, the transaction database server may determine the type of item associated with the unique identifier, and validate all or some of the claims that are associated with that type of item.

Specifically, the transaction database server may determine that a first item is a package of ground beef, and automatically determine whether the beef is "Hormone Free" and "Halal" based on the identification information of the first item and the received event data associated with the identification information, but not attempt to automatically determine that the beef is "Perfume-free," "Certified Child-Labor Free," or "Not Tested On Animals."

Similarly, the transaction database server may automatically determine that a second item is a consumer electronic, and automatically determine whether the consumer electronic is "Made in the U.S.A." or "UL Listed" based on the identification information of the second item and the received event data associated with the identification, but not attempt to automatically determine that the consumer electronic is "free range."

Such a determination may be performed by storing a look-up table, database, or other mechanisms at the transaction database server that associates identification information with item types, and associates item types with appropriate claims. Table 3 illustrates one such exemplary table, where "#" represents any number, and "A" represents any alphabetical character:

TABLE 3

Sample Identification Information, Item Types, and Appropriate Claims

| Identification Information Format | Item Type | Appropriate Claims |
|---|---|---|
| A-##### (Range: 0-49999) | Food, Ground Beef | No Hormone Kosher Vegetarian Montana-Raised Fresh Never Frozen |
| A-##### (Range: 5000-9999) | Food, Ground Turkey | No Hormone Kosher Vegetarian Cage-Free |
| AAA-AA-AAAA | Consumer Electronics | No Child Labor UL Listed Made In China |
| #A-###-AAA | Clothing | No Perfumes Or Dyes No Child Labor Made In India 100% Cashmere |

TABLE 3-continued

Sample Identification Information, Item Types, and Appropriate Claims

| Identification Information Format | Item Type | Appropriate Claims |
|---|---|---|
| A#######A | Pharmaceutical | Not Tested On Animals Natural Ingredients Generic Made In The U.S.A. |

Additionally, the transaction database server may automatically validate or invalidate a claim based upon user preferences, based upon a user profile, or based on common or historical validation patterns determined through time. For instance, if the user is vegetarian the transaction database server may automatically check all items, or all food items, to determine whether they are vegetarian, based on the user indicating a preference for this type of validation to occur for all validations, or for validations of food products. Such an approach would save the user from having to input that they wished to check for meat content on each and every validation where the item is a food product.

Similarly, based on accessing a user profile, the transaction database server may determine that the user fits into a class, category or type of user that would be interested in running particular validations for all items, or types of items, with or without an explicit claim. Using this user profile information, the transaction database server may access a database that associates the class, category or type of user with validation preferences with that class, category or type of user.

For instance, a user profile may determine that the user practices a certain religion that exercises dietary restrictions, where all food items are automatically validated to determine whether the dietary restriction is satisfied, based on received event data. Using this approach, even if an item claims to be in compliance with the dietary restriction, a user may achieve piece-of-mind by quickly determining, based on viewing the actual event data associated with the identified item, whether their personal commitments and moral obligations have been met.

In the case where multiple identification is received, or where batch identification information is received representing a multitude of items (such as a container of uniquely identifiable items), a claim may be invalidated for the batch as a whole, or for each individual item within the batch. The automatic validation may express the validity of a particular claim for each item within a batch individually, or the claim validity may be expressed as a percentage of items within the batch for which the claim is valid or invalid, for instance describing a compliance percentage. Furthermore, the automatic validation may output those items within the batch for which the claim is valid or invalid.

Identification information uniquely identifying a component of the uniquely identified item may be received based on outputting the received event data. Component event data associated with the component may be received from a second node on the supply chain, and received component event data that validates or invalidates the claim may be output, in real time or near real time to receiving the identification information uniquely identifying the component.

The item may be transformed from a first product to a second product at the node, and the output received event data that validates the claim may further include event data associated with the first product and event data associated with the second product. The first product may be a living product, such as a living animal, fruit or vegetable, where the second product is a non-living product, such as a meat product or a harvested fruit or vegetable.

Furthermore, and as illustrated in FIG. 3B, the polling of event data from the nodes of the supply chain and/or the validation or invalidation of the claim may be performed by a third party certification entity, such as a government agency or agent of the government, or a consumer safety, advocacy or other organization, using a process 350.

The results of the validation may be provided to an end-user, to the owner of the item, or to a vendor selling the item, for example to justify an increased selling price of the item. Briefly, this process includes receiving identification information uniquely identifying an item that has moved through a node in a supply chain, and receiving, from the node, event data associated with the uniquely identified item based on receiving the identification information. The process also includes performing a third party validation of an associated characteristic of the uniquely identified item based on the received event data, and providing a third party certification of the associated characteristic based on performing the third party validation.

In more detail, when the process 350 begins (S351), identification information uniquely identifying an item that has moved through a node in a supply chain is received (S352). The identification information may be received over a network from any node in the supply chain using a user interface similar to user interfaces 101 or 131, which may be generated as part of the validation process. In addition to supplying the identification information, the characteristic or claim to be validated, as well as a third party to perform the validation, may also be supplied by the user.

Event data associated with the uniquely identified item is received from the node based on receiving the identification information (S354), and a third party validation of an associated characteristic of the uniquely identified item based on the received event data (S355). The third party validation may be performed in real time or near real time to receiving the identification information, and may be any type of validation, including a process verification, an age verification, an ownership verification, a shelf-life or expiry date verification, or a source verification. If the identification information identifies a group of items including the item, and the third party validation may be performed for each item of the group.

A third party certification of the associated characteristic is provided based on performing the third party validation (S356), and the process 350 ends (S357). Providing the third party certification may further include providing a physical or digital certificate identifying the item and indicating that a third party has validated the associated characteristic. The certificate may be provided to an owner, a potential purchaser, or a seller of the item.

In the case where multiple items are identified and only a portion of the items satisfy the certification criteria, providing the third party certification may further include identifying a non-conforming item of the group whose associated characteristic is invalidated, and identifying a conforming item of the group whose associated characteristic is validated.

Performing the third party validation may include applying a rule to the received event data, and identifying (or certifying) a statistical likelihood that the associated characteristic is valid. Performing the third party validation may further include performing a recursive validation, in which a component of the uniquely identified item is identified using the received event data, and the third party validation is performed on the identified component.

Figure 7:
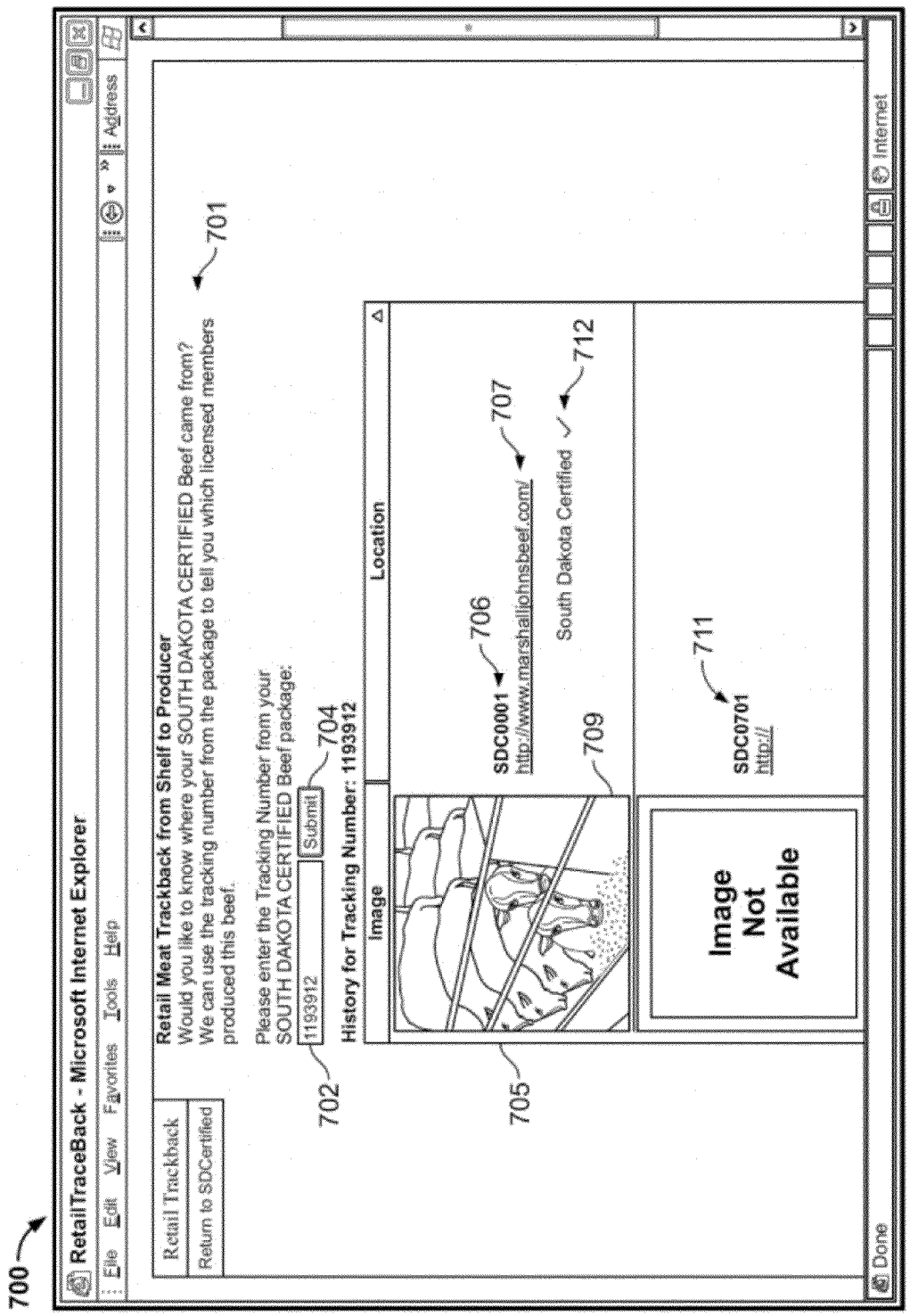

FIGS. 7 to 10 illustrate exemplary user interfaces for entering identification information and outputting event information that validates a claim. Briefly, FIG. 7 shows a web-based user interface 700 that, by providing fewer options and by outputting event data in a user friendly manner, is oriented for an end-user or consumer.

Figure 8:
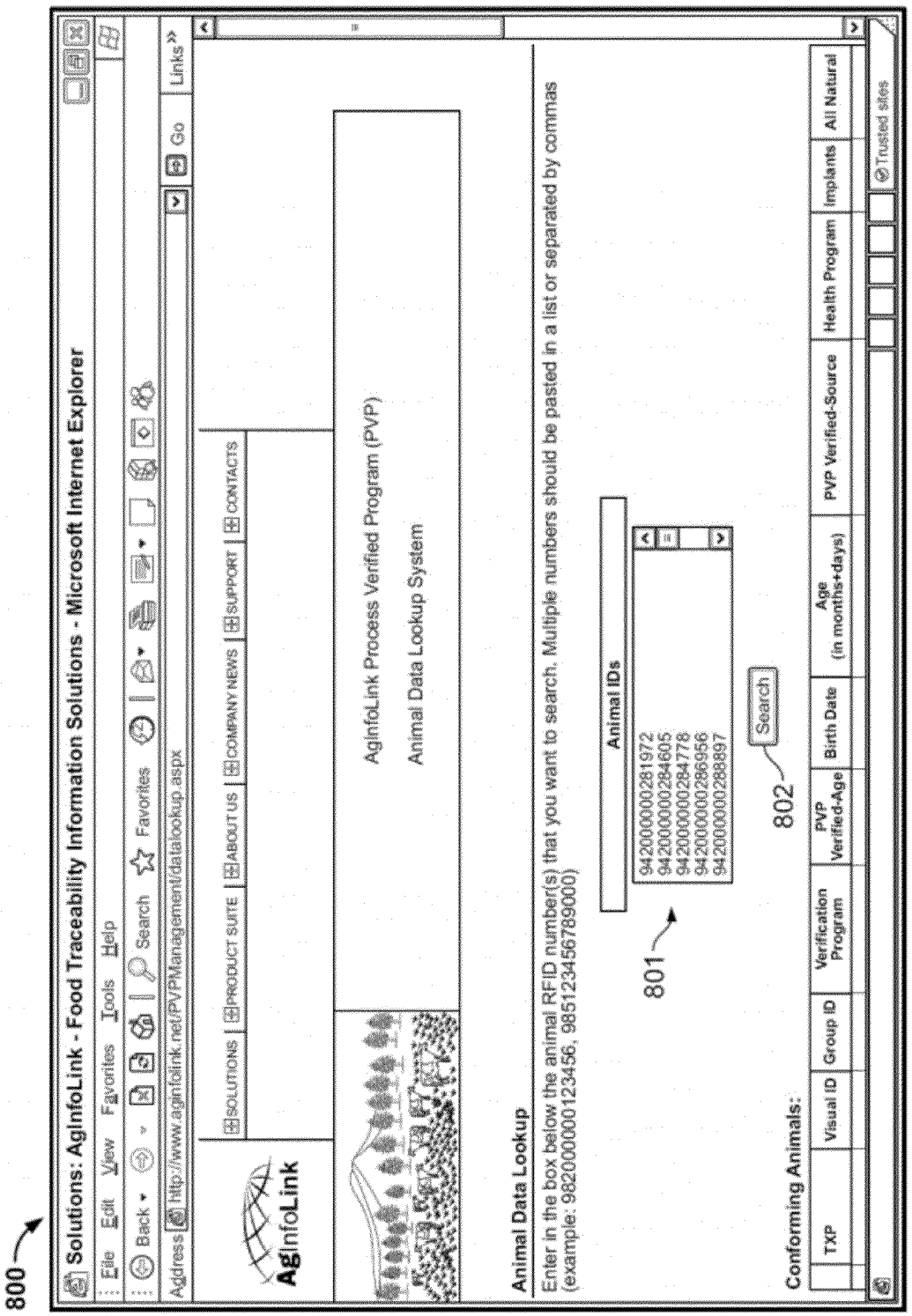
Figure 9B:
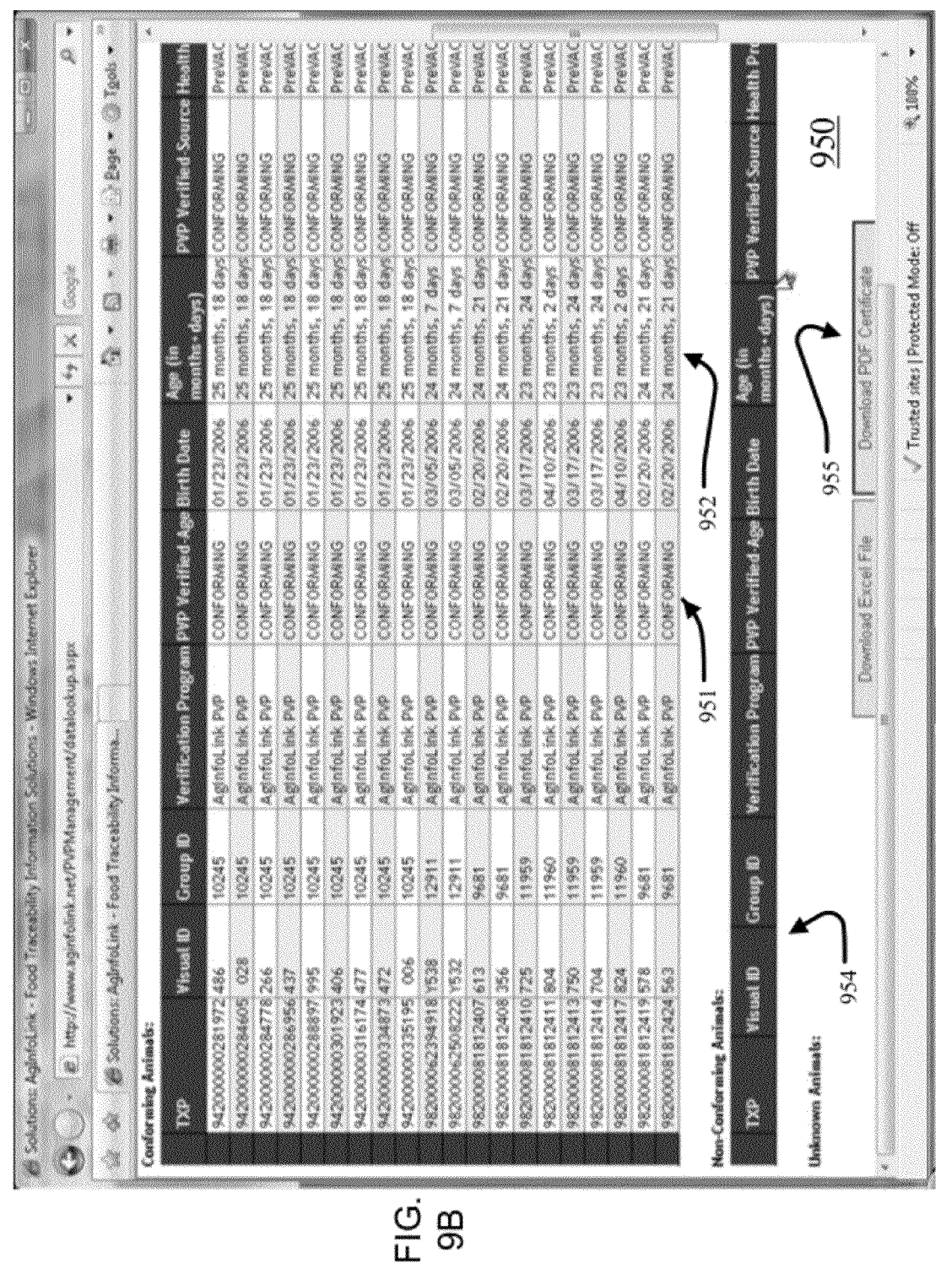
Figure 10:
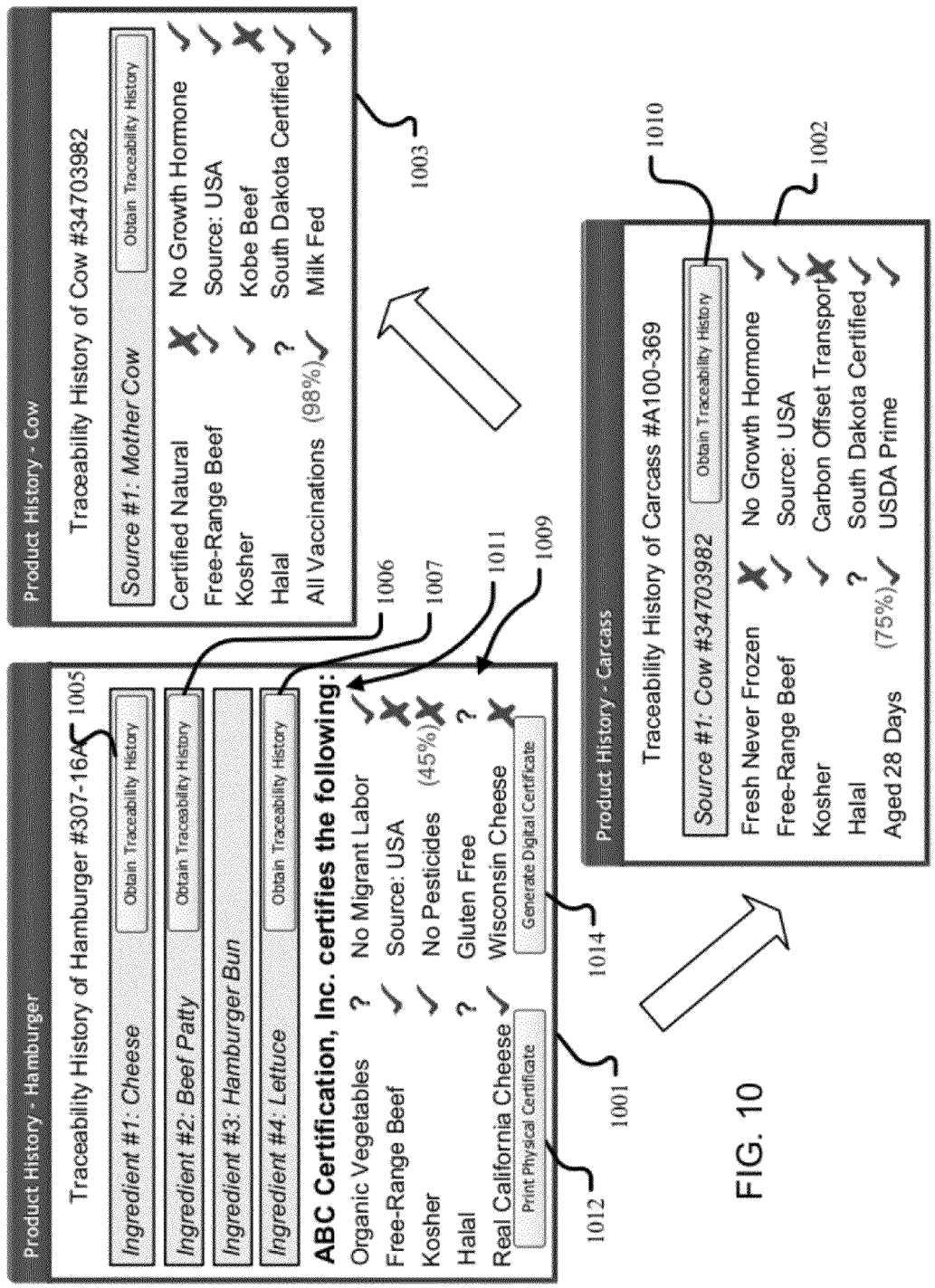

Furthermore, FIGS. 8 and 9A and 9B show web-based user interfaces 800, 900 and 960 for validating source and age of cattle, and FIG. 10 illustrates user interfaces 1001 to 1003, which automatically and iteratively or recursively validates claims for an item in a supply chain through a multiple phases or states.

In FIG. 7, the user interface 700 includes a text region 701 that describes the purpose or goal of the claim validation, and instructs the user how to use the enhanced claim validation application. In particular, the text region 701 tells the user that the user interface 700 can be used to confirm that a beef product is truly "South Dakota Certified™" Beef.

In confirming that the beef purchased by the consumer satisfies this certification, the enhanced claim validation application does not merely access a local lookup table to cross-reference an input identifier of the beef; rather the application actively queries or polls at least one node within the supply chain of the identified beef item, retrieves event data associated with the beef item, applies rules against the retrieved event data, and displays the event data or an interpretation of the event data to the user in real time or near real time to receiving the identification information based on applying the rules. In doing so, the text region 701 also instructs the user to enter a tracking number, or unique identification number, of a beef item into text field 702.

The user may locate the tracking number from the packaging, sales literature, advertising or other documentation associated with the beef item, of verbally from a sales person or customer service personnel. Upon entering the tracking number ("1193912") into the text field and selecting the submit form control 704, the enhanced claim validation application queries nodes in a supply chain for event data, using the entered tracking number, receives event data associated with the tracking number, and prepares the event data for output to the user. Output event data may be displayed by completely refreshing a web page that includes user interface 700, or the user interface 700 may include Asynchronous Java and XML (AJAX) or other controls that allow the user interface 700 to be updated without refreshing the web page.

In this example, the event data accessed at the transaction database in response to the tracking number query indicates that the beef item identified with tracking number 1193912 was processed in at least two source nodes, "SDC0001," and "SDC0701," which a lookup table or other mechanism on the transaction database server can automatically identify as "Marshall John Beef," and another unidentified ranch. Since user interface 700 is intended for use by a customer, it may be designed only to provide sufficient information to validate the claim, and may not be designed, for example, to output all received event data, or to allow the user to recursively or iteratively track the event history of previous phases or states, or components of the item.

In this regard, in event data output window 705, the user interface 700 displays the identifier 706 of the first source node of the item and a URL 707 of the first source node. Since the received event data from this first source node includes a picture or image 709 of the actual cattle that was eventually processed into the beef item, the image 709 is also displayed in the user interface 700. Similarly, the user interface 700 displays the identifier 710 of the second source node of the item, but does not display a URL or an image because that information is not available, not identifiable, or superfluous.

Using event data or interpreted event data output in the user interface 700, the user may manually validate the claim that the beef item is "South Dakota Certified™" beef by selecting the URL 707, and determining that "Marshall Johns Beef" sells beef that satisfies this certification. Furthermore, since the enhanced claim validation application can use rules to automatically validate this claim by cross-referencing the identifier 706 against a database of sources of "South Dakota Certified™" beef, or by cross-referencing the address of the first source node to determine if it is located in South Dakota, and output an interpretation or indicia of this validation.

In user interface 700, for example, indicia 712 indicates that the first source node satisfies the "South Dakota Certified™" beef certification. The output of the indicia 712 occurs in real time or near real time to the selection of the submit form control 704. Each meat item has a placed on it that can be traced back to the animal from which it came, for example by querying the carcass information. A consumer can access a web-based lookup system to query the animal movement system, to identify all of the previous owners of that animal.

User interfaces 800 and 900 and 950 in FIGS. 8 and 9A and 9B, respectively, are used in a similar manner to validate or verify the source and age of cattle. FIG. 8 illustrates a lookup site relating to an exemplary USDA-approved Process Verified Program. Packing plants will pay a premium price for Process Verified these animals, so people selling the animals can receive those premiums at the time of sale if they have a certificate that can be authenticated by the buyer. Thus the lookup site may be a public web site where you can drop in a list of unique animal identifiers.

In more detail, animal RFID numbers that uniquely identify cattle are entered into open interaction element 801, and a form submission control 802 is selected. Based on the selection of this control, the enhanced claim validation application queries nodes of a supply chain that processes the animals identified by the input RFID numbers, and outputs via user interface 900 the animal RFID numbers (columns 901a and 901b), the birth date of the identified animals (columns 902a and 902b), and an indicia that validates or verifies the source of the identified animals against predefined or pre-selected criteria (columns 904a and 904b), or validates or verifies that the identified animal has auditable source information.

In order for an animal to comply with the age and source information, each animal must have auditable information on both its age, and where the animal originated. Knowing the animal's age is very important for purposes of beef export, knowing the animal's source is important for purposes of disease traceability, etc. Interested parties can use a public on-line web site to enter the unique identifier on the animal, and get a United States Department of Agriculture approved certificate the certifies the animal is of a specific age, and that there is an auditable record of where that animal originated. The third party validation is evidenced by a seal 905 on the certificate, assuring end-users of the product of the integrity of the validation. By printing out user interface 900, the user has generated a certificate evidencing a third-party validation that can be brought to an auction house to receive an addition premium on identified animals.

FIG. 9B provides an information listing showing, among other things, animal identifiers and identifying whether the shown animals comply with a certain claim. Based on the selection of the control 802, the enhanced claim validation application queries nodes of a supply chain that processes the animals identified by the input RFID numbers, and outputs via user interface 950 an indicia (column 951) of whether particular animals conform to a claim, as well as event data supporting the validation such as age data (column 952).

The user interface 950 also includes a region 953 for identifying animals which do not conform to the claim. Furthermore, the user may generate a certificate (in this case, an electronic .PDF certificate) by selecting control 955. By generating this certificate, the user can present evidence to an entity downstream in the supply chain that they have complied with particular safeguards or have conformed their practices to particular standards, raising the value of the item and generally increasing supply chain transparency.

As noted above, FIG. 10 illustrates user interfaces 1001 to 1003, that automatically and iteratively or recursively validates claims for an item in a supply chain through a multiple phases or states. Using user interfaces 1001 to 1003, claims to validate are automatically selected based on the type of item being checked.

In more detail, user interface 1001 is generated and output as a result of a user entering identification information ("307-16A") for a hamburger, and further as a result of a transaction database server querying nodes of a supply chain for historical event data relating to the hamburger and/or components of the hamburger. Such identification information may be found, for example, on the packaging of a frozen hamburger, or on the packaging or receipt of a freshly cooked hamburger. Notably, the user is not required to indicate which claims they would like to validate or verify.

Based on received event data, the user interface 1001 displays the components or ingredients of the hamburger, including cheese, beef patty, hamburger bun, and lettuce. As described in further detail below, since the received event information indicates that the cheese, beef patty, and lettuce (but not the hamburger bun) are each associated with a unique identifier, controls 1005 to 1007 are displayed in conjunction with the cheese, beef patty, and lettuce, respectively, to allow a user to validate claims against these items as well.

Region 1011 of the user interface 1001 displays the third party who has performed the validation ("ABC Certification, Inc."). The user interface also includes controls, in this case buttons 1012 and 1014, which allow a user to generate a physical or digital certificate evidencing the third party validation.

Having determined that the components of the hamburger item include cheese, a beef patty, a hamburger bun, and lettuce, the transaction database server accesses a database that associates item types with appropriate claims, and generates a list of claims that match, or would be appropriate for, the components of the hamburger item, as well as the hamburger item as a whole. For instance, appropriate claims for the cheese component include "Real California Cheese" or "Wisconsin Cheese," claims for the beef patty component include "Free-Range Beef," claims for the hamburger bun component include "Gluten Free," and claims for the lettuce component include "No Pesticides" and "Organic Vegetables."

Furthermore, claims for the hamburger item as a whole include "Kosher," "Halal," "No Migrant Labor," and "Source: USA," since the result of a claim verification for these claims should depend on the results of individual claim verifications for each component. Since space is limited on the user interface 1001, the transaction database server may select, if a large number of claims are determined to be appropriate, random claims, a certain number of claims per each component, a user's explicitly or implicitly-determined preferred claims, or claims based on any number of other factors. Where the enhanced claim validation application determines a probability (versus a certainty or near certainty) that the claim is valid or invalid, the probability is shown within the user interface as a percentage. These probabilities may also be presented on the certifications provided by the third party, if applicable.

The transaction database server performs an automatic claim validation for each of the claims based on receiving event data in real time or in near real time to entering the identification information for the hamburger item, and outputs indicia (in the form of a check mark, a red 'X,' or a question mark) indicating the validity of each appropriate claim in window 1009. Notably, the "Source: USA" label claim is considered invalid if any of the components of the hamburger item, such as the lettuce, are sourced from outside the United States. Using simplified output indicia, and by avoiding the output of raw event data itself, the user interface 1001 is easily interpretable and navigable by even the most novice computer user.

Having reviewed the traceability history of the hamburger item as a whole, the user may wish to review the traceability history of the carcass that produced the beef patty itself, using the identification information ("A100-369") of the carcass. This can be accomplished by selecting control 1006. In one implementation, the transaction database server pre-fetches event information for all generations of all components of an item being reviewed, while in another implementation only historical event data for an item being viewed is received upon the receipt of identification information, or historical event data is received for an item and N previous states or phases of an item.

Upon detecting the selection of the control 1006, for example, the transaction database server may actively query nodes for event data that relates to a uniquely identified carcass that produced the beef patty, or the transaction database server may merely access the transaction database to locate event data that has already been queried based on the claim validation of the hamburger item. Similarly, the transaction database server may determine appropriate claims to validate, and may even proceed to validate these appropriate claims, prior to the selection of a component or previous state or phase of an item.

In any case, as above, the transaction database server dynamically or automatically determines appropriate claims to validate based on a detected or determined type of the beef carcass item. For instance, the user interface 1002 now includes other beef-related claims that were not shown in the user interface 1001, such as a "Fresh Never Frozen" claim, or a "Carbon Offset Transportation" claim which purports to have offset the carbon involved in the transportation of the carcass. Since the user is specifically requesting the validation of a claim relating to beef, the user interface 1002 does not reference claims that are not associated with beef, such as "Organic Vegetables," or "Real California Cheese." As above, the enhanced claim validation application validates the automatically selected claims, and places determinative indicia adjacent to the claims.

Notably, although user interface 1001 indicates that the label claim "Source: USA" is invalid, the user interface 1001 indicates that this same label claim is valid. This inconsistency may occur because the validation of the label claim in user interface 1001 takes all of the components of an item into effect to validate the label claim of the item as a whole, while the user interface 1002 validates the label claim of the selected component alone. In other words, if the lettuce component may serve to invalidate a "Source: USA" label claim for the hamburger item as a whole in user interface 1001, while this same label claim can be validated with respect to the carcass alone in user interface 1001 because the lettuce is not a component of the carcass itself.

Since the carcass is sourced from a uniquely identifiable cow ("#34703982"), the user may select control 1010 to view the traceability history of the cow and to validate label claims associated therewith. Similar to above, the enhanced claim validation application selects appropriate claims to validate, and performs a validation of the claims with respect to the uniquely identifiable cow by querying nodes of a supply chain or accessing event data stored as a result of a previously issued query. As shown in user interface 1003, since the event data of the uniquely identifiable cow includes a unique identifier of a parent cow of the uniquely identifiable cow, the user may continue to recursively or iteratively investigate claims up through the supply chain.

Figure 12:
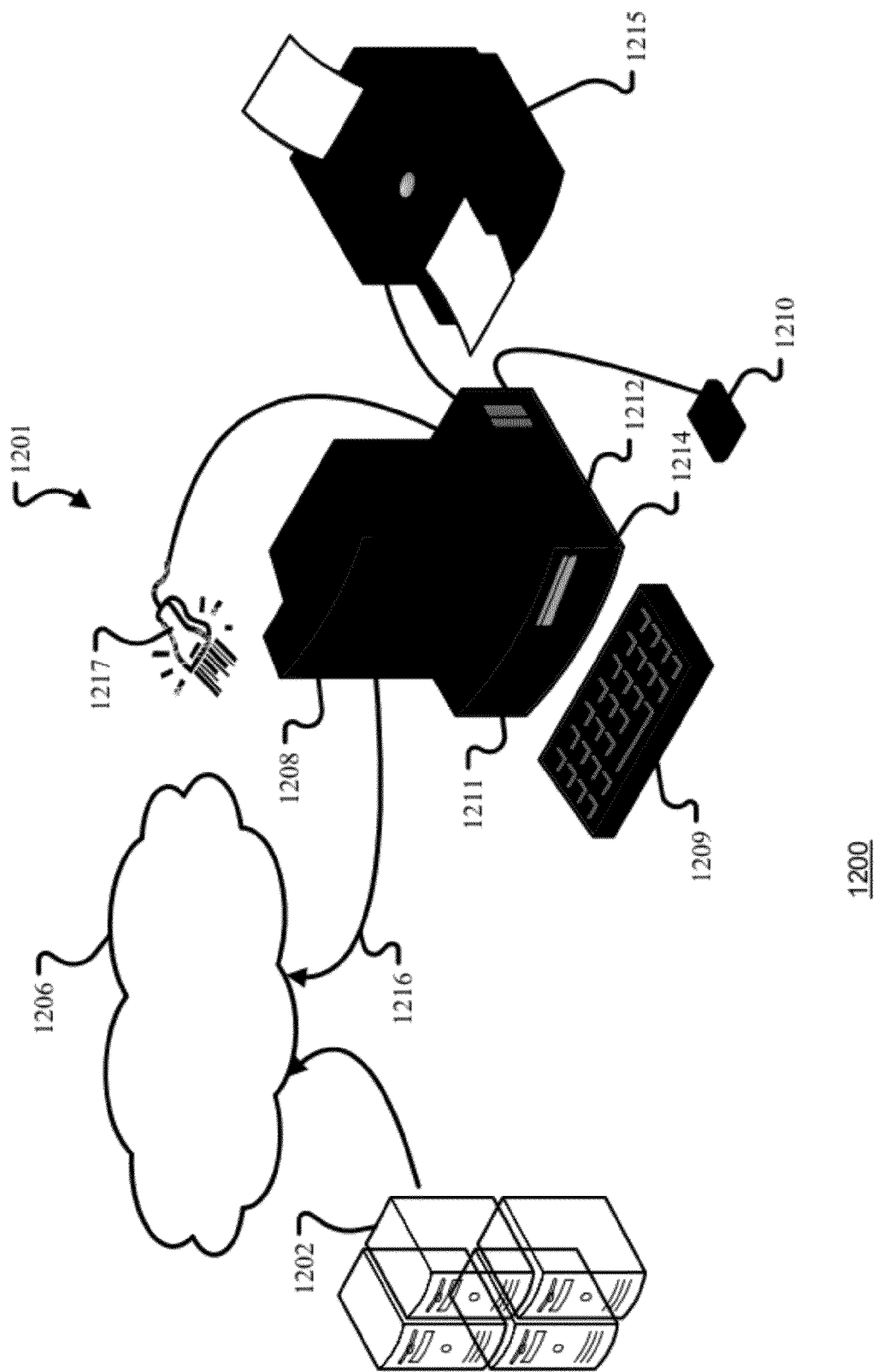
FIG. 12 depicts the exterior appearance of a an exemplary system including a user device and transaction database server.

FIG. 12 depicts the exterior appearance of a an exemplary system including a user device and transaction database server. Briefly, the system 1200 includes a user device 1201 and a transaction database server 1202 that includes a transaction database. As described in further detail, below, the system 1200 includes, inter alia, an interface that receives identification information uniquely identifying an item that has moved through a node in a supply chain, the item being marked with a claim, that receives, from the node, event data associated with the uniquely identified item, and that outputs received event data that validates or invalidates the claim, in real time or near real time to receiving the identification information.

More specifically, the system 1200 may includes one or more computers, and a computer-readable medium coupled to the one or more computers having instructions stored thereon which, when executed by the one or more computers, causes the one or more computers to perform operations. The operations include receiving identification information uniquely identifying an item that has moved through a node in a supply chain, and receiving, from the node, event data associated with the uniquely identified item based on receiving the identification information. The operations also include performing a third party validation of an associated characteristic of the uniquely identified item based on the received event data, and providing a third party certification of the associated characteristic based on performing the third party validation.

In more detail, the hardware environment of the user device 1201 includes a display monitor 1208 for displaying text and images to a user, a keyboard 1209 for entering text data and user commands into the user device 1201, a mouse 1210 for pointing, selecting and adjusting objects displayed on the display monitor 1208, a fixed disk drive 1211, a removable disk drive 1212, a tape drive 1214, a hardcopy output device 1215, a computer network connection 1216, and a reader 1217.

The display monitor 1208 displays graphics, images, and text that comprise the display for the software applications used by the user device 1201, as well as the operating system programs necessary to operate the user device 1201. A user uses the keyboard 1209 to enter commands and data to operate and control the computer operating system programs, the web browser, and/or the enhanced claim validation application. The user uses the mouse 1210 to select and adjust graphics and text objects displayed on the display monitor 1208 as part of the interaction with and control of the user device 1201 and applications running on the user device 1201. The mouse 1210 is any type of pointing device, and may be a joystick, a trackball, a touch-pad, or other pointing device.

The reader 1217 allows the user device 1201 to automatically capture identification information, and may be a RFID reader, a bar code scanner, a digital camera, a digital video camera, a microphone or other digital input device. Software used to provide for the enhanced claim validation application is stored locally on computer readable memory media, such as the fixed disk drive 1211.

In a further implementation, the fixed disk drive 1211 itself may include a number of physical drive units, such as a redundant array of independent disks ("RAID"), or may be a disk drive farm or a disk array that is physically located in a separate computing unit. Such computer readable memory media allow the user device 1201 to access computer-executable process steps, application programs and the like, stored on removable and non-removable memory media.

The wireless or wireline computer network connection 1216 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1106 may be one or more of a LAN network, a corporate or government WAN network, the Internet, or other network.

The computer network connection 1216 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS®("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 1212 is a removable storage device that is used to off-load data from the user device 1201 or upload data onto the user device 1201. The removable disk drive 1212 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD–R" or "DVD+R"), DVD-Rewritable ("DVD–RW" or "DVD+RW"), or DVD-RAM. Operating system programs, applications, and various data files, are stored on disks, which are stored on the fixed disk drive 1211 or on removable media for the removable disk drive 1212.

The tape drive 1214 is a tape storage device that is used to off-load data from the user device 1201 or to upload data onto the user device 1201. The tape drive 1214 may be a quarter-inch cartridge ("QIC"), 4 mm digital audio tape ("DAT"), 8 mm digital linear tape ("DLT") drive, or other type of tape.

The hardcopy output device 1215 provides an output function for the operating system programs and applications. The hardcopy output device 1215 may be a printer or any output device that produces tangible output objects, including textual or image data or graphical representations of textual or image data. While the hardcopy output device 1215 is depicted as being directly connected to the user device 1201, it need not be. For instance, the hardcopy output device 1215 may be connected to device 1201 via a network interface, such as a wireline or wireless network.

Furthermore, although the user device 1201 is illustrated in FIG. 12 as a desktop PC, in further implementations the user device 1201 may be a laptop, a workstation, a midrange computer, a mainframe, a set top box, an embedded system, telephone, a handheld or tablet computer, a PDA, an iPod, a digital picture frame, or other type of computer.

Figure 13:
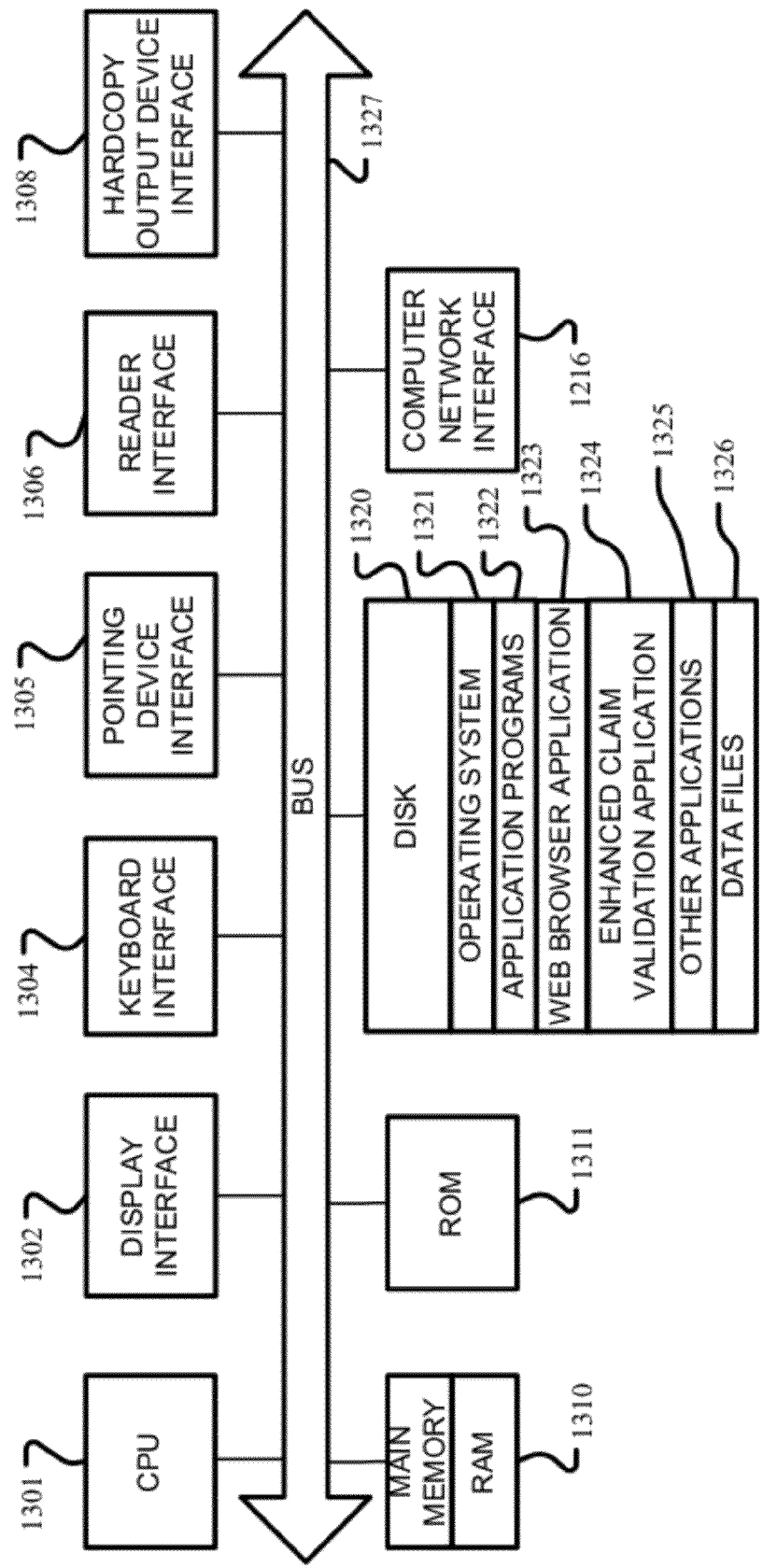
FIG. 13 illustrates the internal architecture of the user device of FIG. 12.

FIG. 13 illustrates the internal architecture of the user device of FIG. 12. The computing environment includes a computer central processing unit ("CPU") 1301 where the computer instructions that comprise an operating system or an application are processed; a display interface 1302 which provides a communication interface and processing functions for rendering graphics, images, and texts on the display monitor 1208; a keyboard interface 1304 which provides a communication interface to the keyboard 1209; a pointing device interface 1305 which provides a communication interface to the mouse 1210 or an equivalent pointing device; a reader interface 1306 which provides a communication interface to the reader 1217; a hardcopy output device interface 1308 which provides a communication interface to the hardcopy output device 1215; a random access memory ("RAM") 1210 where computer instructions and data are stored in a volatile memory device for processing by the computer CPU 1301; a read-only memory ("ROM") 1311 where invariant low-level systems code or data for basic system functions such as basic input and output ("I/O"), startup, or reception of keystrokes from the keyboard 1209 are stored in a non-volatile memory device; a storage 1320 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1321, application programs 1322 (including web browser application 1323, enhanced claim validation application 1324, and other applications 1325 as necessary) and data files 1326 are stored; and a computer network interface 1316 which provides a communication interface to the network 1206 over the computer network connection 1216. The constituent devices and the computer CPU 1301 communicate with each other over the computer bus 1327.

Briefly, a computer program product is encoded or tangibly embodied in disk 1320, a machine-readable storage medium. The computer program product includes instructions that, when read by a machine, operate to cause a data processing apparatus to receive identification information uniquely identifying an item that has moved through a node in a supply chain, the item being marked with a claim, to receive, from the node, event data associated with the uniquely identified item, and to output received event data that validates or invalidates the claim, in real time or near real time to receiving the identification information.

Furthermore, the disk 1320 may be encoded with a computer program including instructions that, when executed, operate to cause a computer to perform operations including receiving identification information uniquely identifying an item that has moved through a node in a supply chain, and receiving, from the node, event data associated with the uniquely identified item based on receiving the identification information. The operations also include performing a third party validation of an associated characteristic of the uniquely identified item based on the received event data, and providing a third party certification of the associated characteristic based on performing the third party validation.

The RAM 1310 interfaces with the computer bus 1327 so as to provide quick RAM storage to the computer CPU 1301 during the execution of software programs such as the operating system application programs, and device drivers. More specifically, the computer CPU 1301 loads computer-executable process steps from the fixed disk drive 1211 or other media into a field of the RAM 1310 in order to execute software programs. Data is stored in the RAM 1310, where the data is accessed by the computer CPU 1301 during execution.

Also shown in FIG. 13, the user device 1201 stores computer-executable code for a operating system 1321, and application programs 1322 such as word processing, spreadsheet, presentation, gaming, web browsing, JavaScript engine, or other applications. Although it is possible to provide for the enhanced claim validation application using the above-described implementation, it is also possible to implement the functions according to the present disclosure as a dynamic link library ("DLL"), or as a plug-in to other application programs such as an Internet web-browser such as the APPLE® SAFARI® web browser or the MICROSOFT® INTERNET EXPLORER® web browser.

The computer CPU 1301 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1301 is more than one processing unit, including a multiple CPU configuration found in high-performance workstations and servers, or a multiple scalable processing unit found in mainframes.

The operating system 1321 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL®CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1321 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

Figure 14:
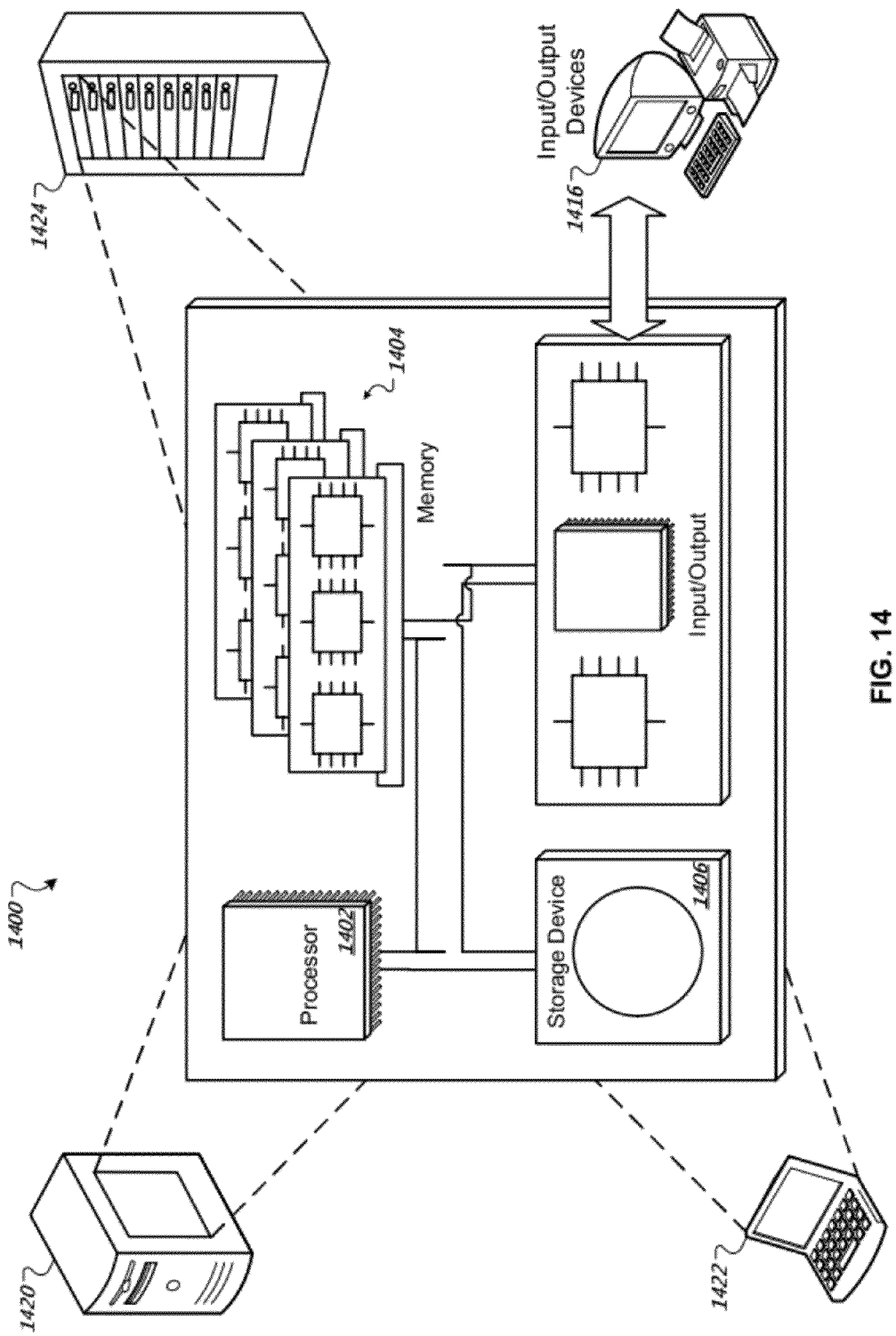
FIG. 14 is a block diagram of computing devices that may be used to implement the systems and methods described in this document, as either a client or as a server or plurality of servers.

FIG. 14 is a block diagram of a computing devices 1400 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. The computing device 1400 may represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports, and a low speed interface connecting to low speed bus and storage device 1406. Each of the components, are interconnected using various busses, and may be mounted on a common motherboard or in other manners as appropriate. The processor 1402 may process instructions for execution within the computing device 1400, including instructions stored in the memory 1404 or on the storage device 1406 to display graphical information for a GUI on an external input/output device, such as display 1416 coupled to the high speed interface. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a computer-readable medium. In one implementation, the memory 1404 is a volatile memory unit or units. In another implementation, the memory 1404 is a non-volatile memory unit or units.

The storage device 1406 is capable of providing mass storage for the computing device 1400. In one implementation, the storage device 1406 is a computer-readable medium. In various different implementations, the storage device 1406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1404, the storage device 1406, or memory on processor 1402.

The high speed controller manages bandwidth-intensive operations for the computing device 1400, while the low speed controller manages lower bandwidth-intensive operations. Such allocation of duties is exemplary only. In one implementation, the high-speed controller 1408 is coupled to memory 1404, display 1416 (e.g., through a graphics processor or accelerator), and to high-speed expansion ports, which may accept various expansion cards (not shown). In the implementation, low-speed controller is coupled to storage device 1406 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device. Each of such devices may contain one or more of computing device 1400, and an entire system may be made up of multiple computing devices 1400 communicating with each other. The computing device 1400 may include one or more sensors (not shown), such as gyroscopes, cameras or GPS (Global Positioning Satellite) trackers, configured to detect or sense motion or position of the computing device 1400.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While FIGS. 12 and 14 illustrate various exemplary implementations of a computing system that executes program code, or program or process steps, configured to effectuate the enhanced validation of a claim, other types of computers may also be used as well.

As to formal matters, while the term "user" has been consistently used to describe an entity that interacts with these processes, such a generalization is also intended to describe multiple related or unrelated, living or automated entities or beings that interact with these processes at various different, overlapping or non-overlapping states. In a similar vein, the term "selection" is intended to denote throughout a manual selection by a human, an automatic selection by a non-human, or some combination thereof. Finally, it is noted that, for the sake of brevity, the term "JavaScript" is intended to reference the SUN MICROSYSTEMS® JAVASCRIPT® programming language, and the term "XML" is intended to reference 'eXtensible Markup Language' throughout.

Finally, while the approach described herein refers to transactional data which is generated, shared, recorded, stored, filtered or otherwise accessed as "event data," any other type of proprietary or non-proprietary, formatted or free-form data (such as attribute data, data collected and shared as a transaction between systems, or data input by a user and accepted by a system), data structure, or information that is accessed in any supply chain process or transaction may be used with or instead of "event data" to support the validation. This transactional data may be, for example, industry standard data, including data that is not processed by the Aginfolink® Pony Express™ framework.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by one or more computers associated with a third party validation entity, from an owner of an item that has moved through one or more nodes of a supply chain, from a vendor of the item, or from a potential purchaser of the item, identification information that uniquely identifies the item;
in response to receiving the identification information, transmitting, by the third party validation entity, a request to a subset of the nodes of the supply chain for event data associated with the uniquely identified item;
receiving, by the third party validation entity, the requested event data associated with the uniquely identified item from the subset of the nodes;
performing, by the third party validation entity, a third party validation of an attribute of the item using the received event data, wherein a result of the validation specifies whether the received event data reflects that an attribute of the item is valid, and wherein the result excludes information that identifies the owner of the item; and
providing, by the third party validation entity, to the owner, to the vendor, or to the potential purchaser, a certificate that references the result of the validation.

2. The method of claim 1, wherein the third party validation is performed in real time or near real time to receiving the identification information.

3. The method of claim 1, wherein the result of the third party validation specifies whether the received event data reflects that the item is process verified in accordance with the United States Department of Agriculture (USDA) Process Verification Program.

4. The method of claim 1, wherein the result of the third party validation specifies whether the received event data reflects that the item satisfies an age and source claim.

5. The method of claim 1, wherein the item comprises livestock.

6. The method of claim 1, wherein providing the third party certification further comprises providing a physical or digital certificate identifying the item and indicating that a third party has validated the attribute.

7. The method of claim 1, wherein:
the identification information identifies a group of items including the item, and
the third party validation is performed for each item of the group.

8. The method of claim 7, wherein providing the third party certification further comprises:
identifying a non-conforming item of the group whose event data reflects that the attribute is not valid; and
identifying a conforming item of the group whose event data reflects that the attribute is valid.

9. The method of claim 1, further comprising:
transmitting data operable to generate a user interface for receiving the identification information.

10. The method of claim 1, further comprising receiving, by the third party validation entity, from the owner of the item, from the vendor of the item, or from the potential purchaser of the item, information that identifies the attribute.

11. The method of claim 1, wherein the request includes the identification information.

12. The method of claim 1, wherein performing the third party validation comprises applying a rule to the received event data.

13. The method of claim 1, wherein the third party certification specifies a probability that the attribute is valid or invalid.

14. The method of claim 1, further comprising:
selecting the trusted third party from among several trusted third parties that are capable of performing the third party validation.

15. The method of claim 1, further comprising:
receiving, by the third party validation entity, information that identifies a type of third party validation to perform; and
selecting, by the third party validation entity, the subset of the nodes of the supply chain based on the type of third party validation to perform.

16. The method of claim 1, further comprising:
determining, by the third party validation entity, a different unique identifier associated with a product that was transformed at a node of the supply chain to produce the item,
wherein the request references the different unique identifier.

17. A non-transitory computer-readable medium encoded with a computer program comprising instructions that, when executed, operate to cause a computer to perform operations comprising:
receiving, by a third party validation entity, from an owner of an item that has moved through one or more nodes of a supply chain, from a vendor of the item, or from a potential purchaser of the item, identification information that uniquely identifies the item;
in response to receiving the identification information, transmitting, by the third party validation entity, a request to a subset of the nodes of the supply chain for event data associated with the uniquely identified item;
receiving, by the third party validation entity, the requested event data associated with the uniquely identified item from the subset of the nodes;
performing, by the third party validation entity, a third party validation of an attribute of the item using the received event data, wherein a result of the validation specifies whether the received event data reflects that an attribute of the item is valid, and wherein the result excludes information that identifies the owner of the item; and
providing, by the third party validation entity, to the owner, to the vendor, or to the potential purchaser, a certificate that references the result of the validation.

18. The computer-readable medium of claim 17, wherein the operations further comprise:
receiving, by the third party validation entity, information that identifies a type of third party validation to perform; and
selecting, by the third party validation entity, the subset of the nodes of the supply chain based on the type of third party validation to perform.

19. The computer-readable medium of claim 17, wherein the operations further comprise:
determining, by the third party validation entity, a different unique identifier associated with a product that was transformed at a node of the supply chain to produce the item,
wherein the request references the different unique identifier.

20. A system comprising:
one or more computers; and
a computer-readable medium coupled to the one or more computers having instructions stored thereon which, when executed by the one or more computers, cause the one or more computers to perform operations comprising:
receiving, by a third party validation entity, from an owner of an item that has moved through one or more nodes of a supply chain, from a vendor of the item, or from a potential purchaser of the item, identification information that uniquely identifies the item,
in response to receiving the identification information, transmitting, by the third party validation entity, a request to a subset of the nodes of the supply chain for event data associated with the uniquely identified item,
receiving, by the third party validation entity, the requested event data associated with the uniquely identified item from the subset of the nodes,
performing, by the third party validation entity, a third party validation of an attribute of the item using the received event data, wherein a result of the validation specifies whether the received event data reflects that an attribute of the item is valid, and wherein the result excludes information that identifies the owner of the item, and
providing, by the third party validation entity, to the owner, to the vendor, or to the potential purchaser, a certificate that references the result of the validation.

21. The system of claim 20, wherein the operations further comprise:
receiving, by the third party validation entity, information that identifies a type of third party validation to perform; and
selecting, by the third party validation entity, the subset of the nodes of the supply chain based on the type of third party validation to perform.

22. The system of claim 20, wherein the operations further comprise:
determining, by the third party validation entity, a different unique identifier associated with a product that was transformed at a node of the supply chain to produce the item,
wherein the request references the different unique identifier.

* * * * *

UNITED STATES PATENT AND TRADEMARK OFFICE
CERTIFICATE OF CORRECTION

PATENT NO.           : 8,249,954 B2                                   Page 1 of 1
APPLICATION NO.      : 12/343814
DATED                : August 21, 2012
INVENTOR(S)          : Dolan et al.

It is certified that error appears in the above-identified patent and that said Letters Patent is hereby corrected as shown below:

Title page, column 1, item (73), under "Assignee:", delete "Aginfolink," and insert -- Aginfolink --, therefor.

Signed and Sealed this
Twenty-third Day of October, 2012

David J. Kappos
*Director of the United States Patent and Trademark Office*